(12) United States Patent
Shao et al.

(10) Patent No.: US 10,104,648 B2
(45) Date of Patent: Oct. 16, 2018

(54) INFORMATION CONFIGURATION METHOD, DATA RECEIVING METHOD, AND DEVICE

(71) Applicant: Huawei Technologies Co., Ltd., Shenzhen (CN)

(72) Inventors: Jiafeng Shao, Beijing (CN); Bingyu Qu, Beijing (CN); Xiaodong Yang, Beijing (CN); Chuanfeng He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 15/010,607

(22) Filed: Jan. 29, 2016

(65) Prior Publication Data
US 2016/0150510 A1 May 26, 2016

Related U.S. Application Data

(63) Continuation of application No. PCT/CN2013/080643, filed on Aug. 1, 2013.

(51) Int. Cl.
*H04L 1/00* (2006.01)
*H04W 72/04* (2009.01)
(Continued)

(52) U.S. Cl.
CPC ......... *H04W 72/042* (2013.01); *H04L 1/1893* (2013.01); *H04W 72/1273* (2013.01)

(58) Field of Classification Search
CPC .. H04B 7/2121; H04B 7/2123; H04B 7/2615; H04B 7/02; H04J 2203/0069; H04J 4/00;
(Continued)

(56) References Cited

U.S. PATENT DOCUMENTS 9,578,628 B2 2/2017 Zhong et al.
2011/0199985 A1 8/2011 Cai et al.
(Continued)

FOREIGN PATENT DOCUMENTS

CN 101882978 A 11/2010
CN 101908955 A 12/2010
(Continued)

OTHER PUBLICATIONS

"Report of E-Mail Discussion: DL Scheduling," TSG-RAN WG2, R2-063, 3$^{rd}$ Generation Partnership Project, Valbonne, France (Dec. 12, 2006).
(Continued)

*Primary Examiner* — Dady Chery
(74) *Attorney, Agent, or Firm* — Leydig, Voit & Mayer, Ltd.

(57) ABSTRACT

An information configuration method, a data receiving method, and a device are provided. A first network device configures a first resource set group of a physical downlink control channel set for user equipment, and configures for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set. The first network device sends information about the first resource set group and information about the second resource set group to the user equipment.

18 Claims, 10 Drawing Sheets

(51) Int. Cl.
*H04L 1/18* (2006.01)
*H04W 72/12* (2009.01)

(58) Field of Classification Search
CPC ...... H04J 2011/0006; H04J 2203/0092; H04Q 2213/394; H04Q 5/12; H04Q 9/12; H04W 72/04; H04W 72/12; H04W 76/00; H04L 5/26
USPC .............. 370/329, 330, 341–348; 455/452.1, 455/550.1, 561
See application file for complete search history.

(56) References Cited

U.S. PATENT DOCUMENTS

| 2012/0026935 | A1 | 2/2012 | Park et al. |
| 2012/0120865 | A1 | 5/2012 | Liang et al. |
| 2013/0157712 | A1 | 6/2013 | Park et al. |
| 2013/0301562 | A1* | 11/2013 | Liao ................. H04W 72/042 370/329 |
| 2016/0050059 | A1 | 2/2016 | Guan et al. |

FOREIGN PATENT DOCUMENTS

| CN | 102752085 A | 10/2012 |
| CN | 103095395 A | 5/2013 |
| EP | 1936853 A1 | 6/2008 |
| EP | 2227058 A2 | 9/2010 |
| EP | 2426843 A1 | 3/2012 |
| WO | 2012174213 A1 | 12/2012 |

OTHER PUBLICATIONS

"CoMP schemes with backhaul constraints and the modeling discussion," 3GPP TSG RAN1 #64, Taipei, Taiwan, R1-110871, 3rd Generation Partnership Project, Valbonne, France (Feb. 21-25, 2011).
CN 201380003287.7, Office Action, dated Jun. 4, 2018.

* cited by examiner

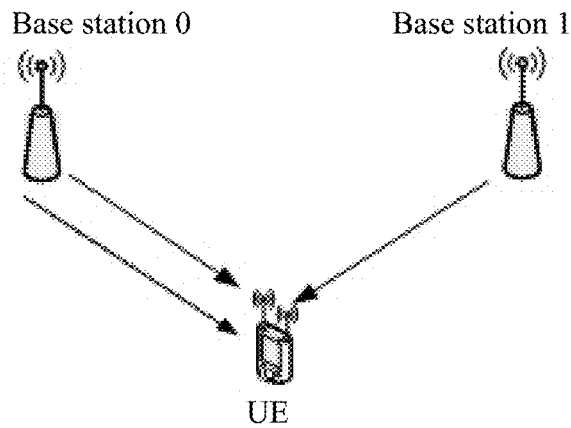

Base station 0    Base station 1

A first network device configures a first resource set group of a physical downlink control channel set for user equipment, and configures, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set — 201

The first network device sends information about the first resource set group and information about the second resource set group to the user equipment — 202

FIG. 2

201 — A first network device configures a first resource set group of a physical downlink control channel set for user equipment, and configures, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set 202 — The first network device sends information about the first resource set group and information about the second resource set group to the user equipment 203 — The first network device sends at least one physical downlink control channel of the physical downlink control channel in the at least one subset to the user equipment, where the at least one physical downlink control channel carries first control information, and the first control information includes scheduling information of the downlink data; and/or a second network device sends at least one physical downlink control channel of the physical downlink control channel in the at least one subset to the user equipment, where the at least one physical downlink control channel carries first control information, the first control information includes scheduling information of the downlink data, and the second network device is controlled by the first network device 204 — After the first network device sends the at least one physical downlink control channel of the physical downlink control channel in the at least one subset to the user equipment, the following is included: If the second network device receives negative acknowledgement information sent by the user equipment, the second network device sends, to the user equipment, at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission; or after the second network device sends the at least one physical downlink control channel of the physical downlink control channel in the at least one subset to the user equipment, the following is included: if the first network device receives negative acknowledgement information sent by the user equipment, the first network device sends, to the user equipment, at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission

FIG. 2a

INFORMATION CONFIGURATION METHOD, DATA RECEIVING METHOD, AND DEVICE

CROSS-REFERENCE TO RELATED APPLICATIONS

This application is a continuation of International Application No. PCT/CN2013/080643, filed on Aug. 1, 2013, which is hereby incorporated by reference in its entirety.

TECHNICAL FIELD

The present invention relates to communications technologies, and in particular, to an information configuration method, a data receiving method, and a device.

BACKGROUND

By using a coordinated multipoint transmission/reception (CoMP for short) technology, multiple network devices can share channel state information and user data information, to perform joint multipoint transmission or reception, so as to implement effective utilization of network resources. However, all existing CoMP technologies are based on an ideal backhaul, and the ideal backhaul means that information may be exchanged between different network devices at a low delay and at a high throughput rate. The network device herein may be a base station, a remote radio head, or the like.

In an actual scenario, because of a factor such as an environment or different manufacturers, it is quite difficult to implement an ideal backhaul. For example, for multiple network devices, there may be an ideal backhaul between some network devices, for example, an ideal backhaul between multiple RRHs controlled by one base station; however, there may also be a non-ideal backhaul between some other network devices.

In an ideal backhaul case, a dynamic point selection technology or a dynamic point blanking technology (dynamic point selection or dynamic point blanking) may be used, so that some network devices may be selected to transmit data to user equipment on some time-frequency resources in a subframe, and other network devices may not transmit data on these time-frequency resources.

In a communications system, a hybrid automatic repeat request (HARQ) technology may be used. In the HARQ technology, a network device transmits data in one data block to user equipment, and if the user equipment correctly receives the data, the user equipment feeds back a positive acknowledgement (ACK for short), or if the user equipment does not correctly receive the data, the user equipment feeds back a negative acknowledgement (NACK for short). If the network device receives the NACK, the network device performs retransmission of the data block, or if the network device receives the ACK, the network device transmits a new data block.

Regardless of initial transmission or retransmission of a data block, in an ideal backhaul case, network devices may quickly share information such as a channel state, or transmitted or received data; therefore, in a case in which data sent by a network device is not correctly received by UE, the network device may dynamically select another network device for data retransmission. Therefore, switching between multiple network devices may be dynamically performed for initial transmission and retransmission in an HARQ process, so as to obtain a multipoint coordination gain.

In a non-ideal backhaul scenario, there is a relatively large delay for information exchange between multiple network devices; therefore, a network device is likely fail to learn a data sending status of another network device in a timely manner, for example, fails to learn whether data sent by another network device is correctly received by UE. Therefore, a dynamic retransmission solution in an ideal backhaul scenario cannot be used, and in the non-ideal backhaul scenario, a coordination gain cannot be obtained by means of coordination between multiple network devices in an aspect of data transmission.

For a same network device, the network device may perform coordination in an aspect of data transmission by means of quick information exchange between multiple modules in the network device, so that a coordination gain is obtained. However, the solution to implementing quick information exchange between multiple modules is relatively complex.

SUMMARY

Embodiments of the present invention provide an information configuration method, a data receiving method, and a device, so that a coordination gain can still be obtained without quick information exchange.

According to a first aspect, an information configuration method is provided, including:

configuring, by a first network device, a first resource set group of a physical downlink control channel set for user equipment, and configuring, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set; and sending, by the first network device, information about the first resource set group and information about the second resource set group to the user equipment.

With reference to the first aspect, in a first possible implementation manner, after the sending information about the second resource set group to the user equipment, the method further includes: sending, by the first network device, at least one physical downlink control channel of the physical downlink control channel in the at least one subset to the user equipment, where the at least one physical downlink control channel carries first control information, and the first control information includes scheduling information of the downlink data; and/or sending, by a second network device, at least one physical downlink control channel of the physical downlink control channel in the at least one subset to the user equipment, where the at least one physical downlink control channel carries first control information, the first control information includes scheduling information of the downlink data, and the second network device is controlled by the first network device.

With reference to the first aspect or the first possible implementation manner of the first aspect, in a second possible implementation manner, the information about the second resource set group includes a correspondence, and the correspondence is a correspondence between the physical downlink control channel in the at least one subset and the second resource set group or a correspondence between the at least one subset and the second resource set group.

With reference to the first aspect or the first possible implementation manner of the first aspect, in a third possible implementation manner, the physical downlink control channel in the at least one subset further indicates the second resource set group.

With reference to the first aspect or any one of the possible implementation manners of the first aspect, in a fourth possible implementation manner, the method further includes: for the physical downlink control channel in the at least one subset, notifying, by the first network device, the user equipment of configuration information of a physical uplink control channel and/or transmit power configuration information of the physical uplink control channel, where the physical uplink control channel is used to carry acknowledgement information of the downlink data indicated by the physical downlink control channel.

With reference to any one of the first possible implementation manner to the fourth possible implementation manner of the first aspect, in a fifth possible implementation manner, after the sending, by the first network device, at least one physical downlink control channel of the physical downlink control channel in the at least one subset to the user equipment, the method further includes: if the second network device receives negative acknowledgement information sent by the user equipment, sending, by the second network device to the user equipment, at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission; or after the sending, by a second network device, at least one physical downlink control channel of the physical downlink control channel in the at least one subset to the user equipment, the method further includes: if the first network device receives negative acknowledgement information sent by the user equipment, sending, by the first network device to the user equipment, the at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission.

With reference to the first aspect or any one of the possible implementation manners of the first aspect, in a sixth possible implementation manner, the method further includes: for the physical downlink control channel in the at least one subset, notifying, by the first network device, the user equipment of one group of common reference signal CRS rate matching information, where at least one piece of CRS rate matching information in the group of CRS rate matching information includes at least two pieces of CRS pattern information, and the at least one piece of CRS rate matching information in the group of CRS rate matching information is used for rate matching for the downlink data indicated by the physical downlink control channel in the at least one subset.

With reference to the first aspect or any one of the possible implementation manners of the first aspect, in a seventh possible implementation manner, the information about the first resource set group includes time-frequency resource configuration information of the physical downlink control channel set; and/or the information about the second resource set group includes time-frequency resource configuration information of the physical downlink control channel for retransmission.

According to a second aspect, a data receiving method is provided, including:

receiving, by user equipment, at least one physical downlink control channel according to information about a first resource set group sent by a first network device, acquiring first control information carried on the at least one physical downlink control channel, and receiving downlink data according to scheduling information that is of the downlink data and included in the first control information, where the first resource set group is a resource set that is of a physical downlink control channel set and preconfigured by the first network device for the user equipment, and the at least one physical downlink control channel is a physical downlink control channel in at least one subset of the physical downlink control channel set; and detecting, by the user equipment in a second resource set group corresponding to information about the second resource set group sent by the first network device, a physical downlink control channel for retransmission corresponding to the downlink data, where the second resource set group is a resource set that is of the physical downlink control channel for retransmission and preconfigured by the first network device for the user equipment.

With reference to the second aspect, in a first possible implementation manner, before the detecting, by the user equipment in a second resource set group, a physical downlink control channel for retransmission corresponding to the downlink data, the method further includes:

determining, by the user equipment according to the at least one received physical downlink control channel and a correspondence included in the information about the second resource set group, the second resource set group corresponding to retransmission of the downlink data, where the correspondence is a correspondence between the physical downlink control channel in the at least one subset and the second resource set group, or the correspondence is a correspondence between the subset of the physical downlink control channel set and the second resource set group, and the correspondence is sent by the first network device.

With reference to the second aspect, in a second possible implementation manner, before the detecting, by the user equipment in a second resource set group corresponding to information about the second resource set group sent by the first network device, a physical downlink control channel for retransmission corresponding to the downlink data, the method further includes:

determining, by the user equipment according to an indication in the at least one received physical downlink control channel, the second resource set group corresponding to retransmission of the downlink data.

With reference to the second aspect or any one of the possible implementation manner of the second aspect, in a third possible implementation manner, the method further includes: the method further includes: for the physical downlink control channel in the at least one subset, receiving, by the user equipment, configuration information that is of a physical uplink control channel and notified by the first network device; and after the receiving downlink data according to scheduling information that is of the downlink data and included in the first control information, the method further includes: determining, by the user equipment according to the configuration information of the physical uplink control channel, resource information of the physical uplink control channel corresponding to the downlink data, and sending acknowledgement information of the downlink data according to the resource information of the physical uplink control channel.

With reference to the third possible implementation manner of the second aspect, in a fourth possible implementation manner, after the receiving downlink data according to scheduling information that is of the downlink data and included in the first control information, the method further includes:
if the acknowledgement information is negative acknowledgement information, receiving, by the user equipment according to the information about the second resource set group, at least one of the physical downlink control channel that is for retransmission and in the second resource set group, where the physical downlink control channel for retransmission carries second control information; and
receiving, by the user equipment, retransmitted downlink data according to scheduling information included in the second control information, where the scheduling information is scheduling information of the downlink data corresponding to the physical downlink control channel for retransmission.

With reference to the third possible implementation manner or the fourth possible implementation manner of the second aspect, in a fifth possible implementation manner, before the sending acknowledgement information of the downlink data according to the resource information of the physical uplink control channel, the method further includes: for the physical downlink control channel in the at least one subset, receiving, by the user equipment, transmit power configuration information that is of the physical uplink control channel and notified by the first network device; and
the sending acknowledgement information of the downlink data according to the resource information of the physical uplink control channel includes: determining, by the user equipment, transmit power information of the physical uplink control channel according to the transmit power configuration information, and sending the acknowledgement information of the downlink data according to the resource information and the transmit power information of the physical uplink control channel.

With reference to the fifth possible implementation manner of the second aspect, in a sixth possible implementation manner, the transmit power configuration information includes reference signal power; and
the determining, by the user equipment, transmit power information of the physical uplink control channel according to the transmit power configuration information, and sending the acknowledgement information of the downlink data according to the resource information and the transmit power information of the physical uplink control channel includes:
determining, by the user equipment, a downlink path loss estimate according to the reference signal power, determining transmit power of the physical uplink control channel according to the downlink path loss estimate, and sending the acknowledgement information of the downlink data according to the resource information and the transmit power of the physical uplink control channel.

With reference to the second aspect or any one of the possible implementation manners of the second aspect, in a seventh possible implementation manner, before the receiving downlink data according to scheduling information that is of the downlink data and included in the first control information, the method further includes:
for the physical downlink control channel in the at least one subset, receiving, by the user equipment, one group of common reference signal CRS rate matching information notified by the first network device, where at least one piece of CRS rate matching information in the group of CRS rate matching information includes at least two pieces of CRS pattern information; and
before the receiving downlink data according to scheduling information that is of the downlink data and included in the first control information, including:
performing, by the user equipment by using the at least one piece of CRS rate matching information in the group of CRS rate matching information, rate matching on the downlink data indicated by the physical downlink control channel in the at least one subset.

According to a third aspect, a network device is provided, including:
a configuring unit, configured to: configure a first resource set group of a physical downlink control channel set for user equipment, and configure, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set; and
a sending unit, configured to send information about the first resource set group and information about the second resource set group to the user equipment.

With reference to the third aspect, in a first possible implementation manner, the sending unit is further configured to: after sending the information about the second resource set group to the user equipment, send at least one physical downlink control channel of the physical downlink control channel in the at least one subset to the user equipment, where the at least one physical downlink control channel carries first control information, and the first control information includes scheduling information of the downlink data.

With reference to the third aspect or the first possible implementation manner of the third aspect, in a second possible implementation manner, the information about the second resource set group sent by the sending unit to the user equipment includes a correspondence, and the correspondence is a correspondence between the physical downlink control channel in the at least one subset and the second resource set group or a correspondence between the at least one subset and the second resource set group.

With reference to the third aspect or the first possible implementation manner of the third aspect, in a third possible implementation manner, the physical downlink control channel that is in the at least one subset and sent by the sending unit to the user equipment further indicates the second resource set group.

With reference to the third aspect or any one of the possible implementation manners of the third aspect, in a fourth possible implementation manner, the sending unit is further configured to: for the physical downlink control channel in the at least one subset, notify the user equipment of configuration information of a physical uplink control channel and/or transmit power configuration information of the physical uplink control channel, where the physical uplink control channel is used to carry acknowledgement information of the downlink data indicated by the physical downlink control channel.

With reference to any one of the first possible implementation manner to the fourth possible implementation manner of the third aspect, in a fifth possible implementation manner, the network device is a first network device;

the network device further includes a receiving unit, configured to receive negative acknowledgement information sent by the user equipment; and the sending unit is further configured to: after the receiving unit receives the negative acknowledgement information, send, to the user equipment, at least one of the physical downlink control channel that is for retransmission and in the second resource set group, where the at least one of the physical downlink control channel for retransmission carries second control information, the second control information includes scheduling information of downlink data corresponding to the at least one of the physical downlink control channel for retransmission, the downlink data corresponding to the at least one of the physical downlink control channel for retransmission is sent by a second network device to the user equipment, and the second network device is controlled by the first network device.

With reference to the third aspect or any one of the possible implementation manners of the third aspect, in a sixth possible implementation manner, the sending unit is further configured to: for the physical downlink control channel in the at least one subset, notify the user equipment of one group of common reference signal CRS rate matching information, where at least one piece of CRS rate matching information in the group of CRS rate matching information includes at least two pieces of CRS pattern information, and the at least one piece of CRS rate matching information in the group of CRS rate matching information is used for rate matching for the downlink data indicated by the physical downlink control channel in the at least one subset.

With reference to the third aspect or any one of the possible implementation manners of the third aspect, in a seventh possible implementation manner, the information about the first resource set group sent by the sending unit includes time-frequency resource configuration information of the physical downlink control channel set, and/or the information about the second resource set group sent by the sending module includes time-frequency resource configuration information of the physical downlink control channel for retransmission.

According to a fourth aspect, user equipment is provided, including:

a storage unit, configured to: store information that is about a first resource set group of a physical downlink control channel set and sent by a first network device to the user equipment in advance, and store information that is about a second resource set group of a physical downlink control channel for retransmission and sent by the first network device to the user equipment in advance;

an acquiring unit, configured to: receive at least one physical downlink control channel according to the information that is about the first resource set group and stored by the storage unit, acquire first control information carried on the at least one physical downlink control channel, and receive downlink data according to scheduling information that is of the downlink data and included in the first control information, where the at least one physical downlink control channel is a physical downlink control channel in at least one subset of the physical downlink control channel set; and a processing unit, configured to detect, in the second resource set group corresponding to the information that is about the second resource set group and stored by the storage unit, the physical downlink control channel for retransmission corresponding to the downlink data.

With reference to the fourth aspect, in a first possible implementation manner, the information that is about the second resource set group and stored by the storage unit includes a correspondence, and the correspondence is a correspondence between the physical downlink control channel in the at least one subset and the second resource set group, or the correspondence is a correspondence between the subset of the physical downlink control channel set and the second resource set group; and the processing unit is further configured to: before detecting, in the second resource set group, the physical downlink control channel for retransmission corresponding to the downlink data, determine, according to the correspondence stored by the storage unit and the at least one physical downlink control channel received by the acquiring unit, the second resource set group corresponding to retransmission of the downlink data.

With reference to the fourth aspect, in a second possible implementation manner, the processing unit is further configured to determine, according to an indication in the at least one physical downlink control channel received by the acquiring module, the second resource set group corresponding to retransmission of the downlink data.

With reference to the fourth aspect or either of the possible implementation manners of the fourth aspect, in a third possible implementation manner, the acquiring unit is further configured to: for the physical downlink control channel in the at least one subset, receive configuration information that is of a physical uplink control channel and notified by the first network device;

the processing unit is further configured to: after the acquiring unit receives the downlink data according to the scheduling information that is of the downlink data and included in the first control information, determine, according to the configuration information that is of the physical uplink control channel and acquired by the acquiring unit, resource information of the physical uplink control channel corresponding to the downlink data; and the user equipment further includes a sending unit, configured to send acknowledgement information of the downlink data according to the resource information that is of the physical uplink control channel and determined by the processing unit.

With reference to the third possible implementation manner of the fourth aspect, in a fourth possible implementation manner, the acquiring unit is further configured to: if the acknowledgement information sent by the sending unit is negative acknowledgement information, receive, according to the information about the second resource set group, at least one of the physical downlink control channel that is for retransmission and in the second resource set group, where the physical downlink control channel for retransmission carries second control information; and receive retransmitted downlink data according to scheduling information included in the second control information, where the scheduling information is scheduling information of the downlink data corresponding to the physical downlink control channel for retransmission.

With reference to the third possible implementation manner or the fourth possible implementation manner of the fourth aspect, in a fifth possible implementation manner, the acquiring unit is further configured to: for the physical downlink control channel in the at least one subset, receive transmit power configuration information that is of the physical uplink control channel and notified by the first network device; and the sending unit is specifically configured to send, in the following manner, the acknowledgement information of the downlink data according to the resource information that is of the physical uplink control channel and determined by the processing unit: determining transmit power information of the physical uplink control channel according to the transmit power configuration information acquired by the acquiring unit, and sending the acknowledgement information of the downlink data according to the resource information and the transmit power information of the physical uplink control channel.

With reference to the fifth possible implementation manner of the fourth aspect, in a sixth possible implementation manner, the transmit power configuration information received by the acquiring unit includes reference signal power; and the sending unit is specifically configured to: in the following manner, determine the transmit power information of the physical uplink control channel according to the transmit power configuration information acquired by the acquiring unit, and send the acknowledgement information of the downlink data according to the resource information and the transmit power information of the physical uplink control channel: determining a downlink path loss estimate according to the reference signal power, determining transmit power of the physical uplink control channel according to the downlink path loss estimate, and sending the acknowledgement information of the downlink data according to the resource information and the transmit power of the physical uplink control channel.

With reference to the fourth aspect or any one of the possible implementation manners of the fourth aspect, in a seventh possible implementation manner, the acquiring unit is further configured to: for the physical downlink control channel in the at least one subset, receive one group of common reference signal CRS rate matching information notified by the first network device, where at least one piece of CRS rate matching information in the group of CRS rate matching information includes at least two pieces of CRS pattern information; and the acquiring module is further configured to: before receiving the downlink data, perform, by using the at least one piece of CRS rate matching information in the group of CRS rate matching information, rate matching on the downlink data indicated by the physical downlink control channel in the at least one subset.

According to a fifth aspect, a network device is provided, including:

a processor, configured to: configure a first resource set group of a physical downlink control channel set for user equipment, and configure, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set; and a transmitter, configured to send, to the user equipment, information about the first resource set group and information about the second resource set group that are configured by the processor.

With reference to the fifth aspect, in a first possible implementation manner, the transmitter is further configured to: after sending the information about the second resource set group to the user equipment, send at least one physical downlink control channel of the physical downlink control channel in the at least one subset to the user equipment, where the at least one physical downlink control channel carries first control information, and the first control information includes scheduling information of the downlink data.

With reference to the fifth aspect or the first possible implementation manner of the fifth aspect, in a second possible implementation manner, the information about the second resource set group sent by the transmitter includes a correspondence, and the correspondence is a correspondence between the physical downlink control channel in the at least one subset and the second resource set group or a correspondence between the at least one subset and the second resource set group.

With reference to the first possible implementation manner of the fifth aspect, in a third possible implementation manner, the physical downlink control channel that is in the at least one subset and sent by the transmitter to the user equipment further indicates the second resource set group.

With reference to the fifth aspect or any one of the possible implementation manners of the fifth aspect, in a fourth possible implementation manner, the transmitter is further configured to: for the physical downlink control channel in the at least one subset, notify the user equipment of configuration information of a physical uplink control channel and/or transmit power configuration information of the physical uplink control channel, where the physical uplink control channel is used to carry acknowledgement information.

With reference to the fifth aspect or any one of the possible implementation manners of the fifth aspect, in a fifth possible implementation manner, the network device is a first network device, the network device further includes a receiver, configured to receive negative acknowledgement information sent by the user equipment, and the transmitter is further configured to: after the receiver receives the negative acknowledgement information, send, to the user equipment, at least one of the physical downlink control channel that is for retransmission and in the second resource set group, where the at least one of the physical downlink control channel for retransmission carries second control information, the second control information includes scheduling information of downlink data corresponding to the at least one of the physical downlink control channel for retransmission, the downlink data corresponding to the at least one of the physical downlink control channel for retransmission is sent by a second network device to the user equipment, and the second network device is controlled by the first network device.

With reference to the fifth aspect or any one of the possible implementation manners of the fifth aspect, in a sixth possible implementation manner, the transmitter is further configured to: for the physical downlink control channel in the at least one subset, notify the user equipment of one group of common reference signal CRS rate matching information, where at least one piece of CRS rate matching information in the group of CRS rate matching information includes at least two pieces of CRS pattern information, and the at least one piece of CRS rate matching information in the group of CRS rate matching information is used for rate matching for the downlink data indicated by the physical downlink control channel in the at least one subset.

With reference to the fifth aspect or any one of the possible implementation manners of the fifth aspect, in a seventh possible implementation manner, the information about the first resource set group sent by the transmitter includes time-frequency resource configuration information of the physical downlink control channel set, and/or the information about the second resource set group sent by the transmitter includes time-frequency resource configuration information of the physical downlink control channel for retransmission.

According to a sixth aspect, user equipment is provided, including:
  a memory, configured to: store information that is about a first resource set group of a physical downlink control channel set and sent by a first network device to the user equipment in advance, and store information that is about a second resource set group of a physical downlink control channel for retransmission and sent by the first network device to the user equipment in advance;
  a receiver, configured to: receive at least one physical downlink control channel according to the information that is about the first resource set group and stored by the memory, acquire first control information carried on the at least one physical downlink control channel, and receive downlink data according to scheduling information that is of the downlink data and included in the first control information, where the at least one physical downlink control channel is a physical downlink control channel in at least one subset of the physical downlink control channel set; and
  a processor, configured to detect, in the second resource set group corresponding to the information that is about the second resource set group and stored by the memory, the physical downlink control channel for retransmission corresponding to the downlink data.

With reference to the sixth aspect, in a first possible implementation manner, the information that is about the second resource set group and stored by the memory includes a correspondence, and the correspondence is a correspondence between the physical downlink control channel in the at least one subset and the second resource set group, or the correspondence is a correspondence between a subset of the physical downlink control channel set and the second resource set group; and
  the processor is further configured to: before detecting, in the second resource set group, the physical downlink control channel for retransmission corresponding to the downlink data, determine, according to the correspondence stored by the memory and the at least one physical downlink control channel received by the receiver, the second resource set group corresponding to retransmission of the downlink data.

With reference to the sixth aspect, in a second possible implementation manner, the processor is further configured to determine, according to an indication in the at least one physical downlink control channel received by the receiver, the second resource set group corresponding to retransmission of the downlink data.

With reference to the sixth aspect or either of the possible implementation manners of the sixth aspect, in a third possible implementation manner, the receiver is further configured to: for the physical downlink control channel in the at least one subset, receive configuration information that is of a physical uplink control channel and notified by the first network device; the processor is further configured to: after the receiver receives the downlink data according to the scheduling information that is of the downlink data and included in the first control information, determine, according to the configuration information that is of the physical uplink control channel and acquired by the receiver, resource information of the physical uplink control channel corresponding to the downlink data; and the user equipment further includes a transmitter, configured to send acknowledgement information of the downlink data according to the resource information that is of the physical uplink control channel and determined by the processor.

With reference to the third possible implementation manner of the sixth aspect, in a fourth possible implementation manner, the receiver is further configured to: if the acknowledgement information sent by the transmitter is negative acknowledgement information, receive, according to the information about the second resource set group, at least one of the physical downlink control channel that is for retransmission and in the second resource set group, where the physical downlink control channel for retransmission carries second control information; and receive retransmitted downlink data according to scheduling information included in the second control information, where the scheduling information is scheduling information of the downlink data corresponding to the physical downlink control channel for retransmission.

With reference to the third possible implementation manner or the fourth possible implementation manner of the sixth aspect, in a fifth possible implementation manner, the receiver is further configured to: for the physical downlink control channel in the at least one subset, receive transmit power configuration information that is of the physical uplink control channel and notified by the first network device; and the transmitter is specifically configured to send, in the following manner, the acknowledgement information of the downlink data according to the resource information that is of the physical uplink control channel and determined by the processor: determining transmit power information of the physical uplink control channel according to the transmit power configuration information received by the receiver, and sending the acknowledgement information of the downlink data according to the resource information and the transmit power information of the physical uplink control channel.

With reference to the fifth possible implementation manner of the sixth aspect, in a sixth possible implementation manner, the transmit power configuration information received by the receiver includes reference signal power; and the transmitter is specifically configured to: in the following manner, determine the transmit power information of the physical uplink control channel according to the transmit power configuration information acquired by the receiver, and send the acknowledgement information of the downlink data according to the resource information and the transmit power information of the physical uplink control channel: determining a downlink path loss estimate according to the reference signal power, determining transmit power of the physical uplink control channel according to the downlink path loss estimate, and sending the acknowledgement information of the downlink data according to the resource information and the transmit power of the physical uplink control channel.

With reference to the sixth aspect or any one of the possible implementation manners of the sixth aspect, in a seventh possible implementation manner, the receiver is further configured to: for the physical downlink control channel in the at least one subset, receive one group of common reference signal CRS rate matching information notified by the first network device, where at least one piece of CRS rate matching information in the group of CRS rate matching information includes at least two pieces of CRS pattern information; and the receiver is further configured to: before receiving the downlink data, perform, by using the at least one piece of CRS rate matching information in the group of CRS rate matching information, rate matching on the downlink data indicated by the physical downlink control channel in the at least one subset.

According to a seventh aspect, a data transmission system is provided, including a first network device and a second network device, where the first network device is configured to: send a transmission resource parameter to the second network device, and transmit downlink data to user equipment by using the transmission resource parameter;

the second network device is configured to transmit the downlink data to the user equipment by using the transmission resource parameter sent by the first network device; and the first network device is further configured to:

notify the user equipment of configuration information of an uplink control channel resource, where the configuration information of the uplink control channel resource is used to indicate, for the user equipment, resource configuration information for sending acknowledgement information corresponding to the downlink data; and receive the acknowledgement information, or instruct the second network device to receive the acknowledgement information.

In a first possible implementation manner of the seventh aspect, if the first network device is further configured to receive the acknowledgement information, and when the acknowledgement information is a negative acknowledgement, the first network device is further configured to retransmit the downlink data to the user equipment;

or, if the first network device is further configured to instruct the second network device to receive the acknowledgement information, and when the acknowledgement information is a negative acknowledgement, the second network device is further configured to retransmit the downlink data to the user equipment.

With reference to the seventh aspect or the first possible implementation manner of the seventh aspect, in a second possible implementation manner, the first network device is specifically configured to instruct, in the following manner, the second network device to receive the acknowledgement information:

notifying, by the first network device, the second network device of the configuration information of the uplink control channel resource that carries the acknowledgement information.

With reference to the seventh aspect or either of the possible implementation manners of the seventh aspect, in a third possible implementation manner, the second network device is further configured to receive one group of common reference signal CRS rate matching information sent by the first network device; and the first network device is further configured to: before transmitting the downlink data to the user equipment by using the transmission resource parameter, determine, from the group of CRS rate matching information, CRS information corresponding to transmission of the downlink data, and perform rate matching by using the determined CRS information; or the second network device is further configured to: before transmitting the downlink data to the user equipment by using the transmission resource parameter, determine, from the group of CRS rate matching information, CRS information corresponding to transmission of the downlink data, and perform rate matching by using the determined CRS information.

With reference to the seventh aspect or any one of the possible implementation manners of the seventh aspect, in a fourth possible implementation manner, the transmission resource parameter sent by the first network device includes at least one of a physical resource used for transmitting the downlink data, a modulation and coding manner, a data block size, a time at which a data block is sent, and a hybrid automatic repeat request process number each time a data block is sent.

According to an eighth aspect, a data transmission system is provided, including a first network device, a second network device, and a third network device; where the first network device is configured to send a transmission resource parameter to the second network device and/or the third network device;

the second network device is configured to transmit downlink data to user equipment by using the transmission resource parameter sent by the first network device; and/or the third network device is configured to transmit the downlink data to the user equipment by using the transmission resource parameter sent by the first network device; and the first network device is further configured to:

notify the user equipment of configuration information of an uplink control channel resource, where the configuration information of the uplink control channel resource is used to indicate, for the user equipment, resource configuration information for sending acknowledgement information corresponding to the downlink data; and receive the acknowledgement information, or instruct the second network device or the third network device to receive the acknowledgement information.

In a first possible implementation manner of the eighth aspect, if the first network device is further configured to receive the acknowledgement information, and when the acknowledgement information is a negative acknowledgement, the first network device is further configured to retransmit the downlink data to the user equipment;

or, if the first network device is further configured to instruct the second network device to receive the acknowledgement information, and when the acknowledgement information is a negative acknowledgement, the second network device is further configured to retransmit the downlink data to the user equipment;

or, if the first network device is further configured to instruct the third network device to receive the acknowledgement information, and when the acknowledgement information is a negative acknowledgement, the third network device is further configured to retransmit the downlink data to the user equipment.

With reference to the eighth aspect or the first possible implementation manner of the eighth aspect, in a second possible implementation manner, the first network device is specifically configured to instruct, in the following manner, the second network device or the third network device to receive the acknowledgement information:

notifying, by the first network device, the second network device or the third network device of the configuration information of the uplink control channel resource that carries the acknowledgement information.

With reference to the eighth aspect or either of the possible implementation manners of the eighth aspect, in a third possible implementation manner, the first network device is further configured to notify the second network device and the third network device of one group of CRS rate matching information; and the second network device is further configured to: before transmitting the downlink data to the user equipment by using the transmission resource parameter sent by the first network device, determine, by using the group of CRS rate matching information, CRS information corresponding to transmission of the downlink data, and perform rate matching by using the determined CRS information; or the third network device is further configured to: before transmitting the downlink data to the user equipment by using the transmission resource parameter sent by the first network device, determine, by using the group of CRS rate matching information, CRS information corresponding to transmission of the downlink data, and perform rate matching by using the determined CRS information.

With reference to the eighth aspect or any one of the possible implementation manners of the eighth aspect, in a fourth possible implementation manner, the transmission resource parameter information sent by the first network device includes at least one of a physical resource used for transmitting the downlink data, a modulation and coding manner, a data block size, a time at which a data block is sent, and a hybrid automatic repeat request HARQ process number each time a data block is sent.

In the foregoing solution, a network device separately configures, for user equipment, a first resource set group of a physical downlink control channel set and a second resource set group of a physical control channel for retransmission, where the physical control channel for retransmission is a physical control channel for retransmission corresponding to downlink data indicated by a physical control channel in at least one subset of the physical control channel set, so that the UE can detect, in the preconfigured first resource set group and second resource set group, a physical downlink control channel used for initial transmission and the physical downlink control channel used for retransmission. In this way, in an HARQ process, the UE can obtain a coordination gain of multiple resources by using multiple preconfigured transmission resources (including resources in the first resource set group and the second resource set group). Therefore, in the embodiments of the present invention, a coordination gain can still be implemented only with a need of semi-static configuration and without a need of quick information exchange. In addition, the network device separately preconfigures, for the user equipment, the first resource set group that is of the physical downlink control channel set and used for initial transmission and the second resource set group used for retransmission, which reduces complexity of blind detection, which the UE performs when obtaining a coordination gain, on the physical downlink control channel for retransmission.

BRIEF DESCRIPTION OF DRAWINGS

FIG. 1 is an optional application scenario of an embodiment of an information configuration method and a data receiving method according to the present invention;

FIG. 2 is a schematic flowchart of an embodiment of an information configuration method according to the present invention;

FIG. 2a is a schematic flowchart of another embodiment of an information configuration method according to the present invention;

DESCRIPTION OF EMBODIMENTS

Figure 3:
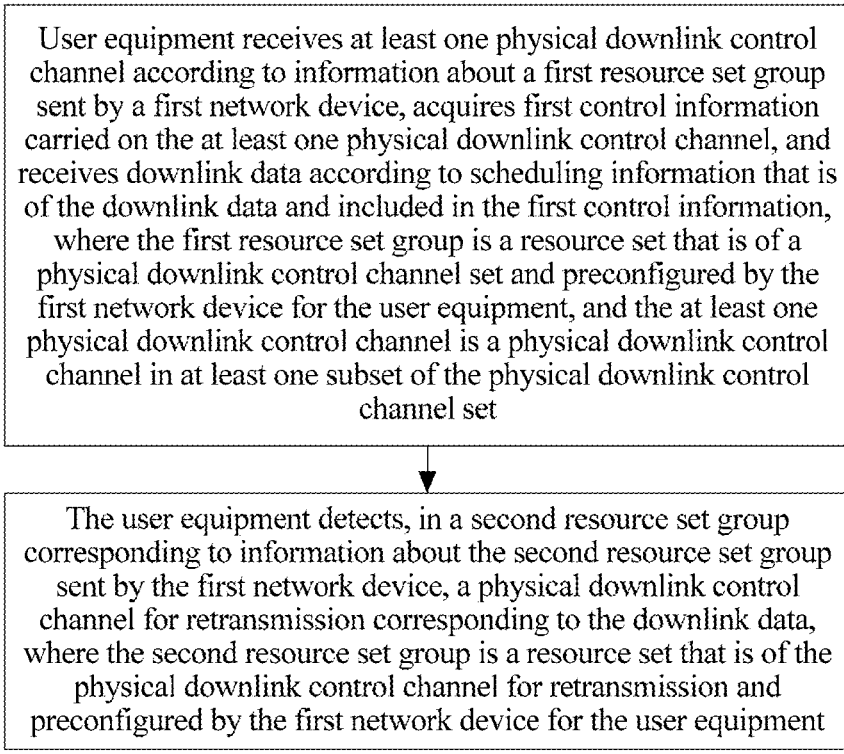
FIG. 3 is a schematic flowchart of an embodiment of a data receiving method according to the present invention.

FIG. 1 is an optional application scenario of an embodiment of an information configuration method and a data receiving method according to the present invention. As shown in FIG. 1, a base station 0 and a base station 1 jointly transmit data to UE to enhance signal receiving quality of the UE; in addition, when the UE fails to receive the data, either of the base station 0 and the base station 1 is responsible for retransmitting the data to the UE. Certainly, during specific implementation, the methods in the embodiments of the present invention are not limited to the application scenario shown in FIG. 1, and there are not always two base stations. The following describes the information configuration method or the data receiving method in the embodiments of the present invention.

In a non-ideal backhaul scenario, there is a relatively large delay for information exchange between multiple network devices; therefore, a network device is likely fail to learn a data sending status of another network device in a timely manner, for example, fails to learn whether data sent by another network device is correctly received by UE. Therefore, a dynamic retransmission solution in an ideal backhaul scenario cannot be used, and in the non-ideal backhaul scenario, a coordination gain cannot be obtained by means of coordination between multiple network devices in an aspect of data transmission. In addition, for a same network device, the network device may perform coordination in an aspect of data transmission by means of quick information exchange between multiple modules in the network device, so that a coordination gain is obtained. However, the solution to implementing quick information exchange between multiple modules is relatively complex. The following methods in the embodiments of the present invention describe how multiple transmission points implement a coordination gain by using the methods.

It should be noted that the embodiments of the present invention may be combined with each other in a case in which no conflict exists.

Embodiment 1

FIG. 2 is a schematic flowchart of an embodiment of an information configuration method according to the present invention. As shown in FIG. 2, the method may include the following steps.

201. A first network device configures a first resource set group of a physical downlink control channel set for user equipment, and configures, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set.

202. The first network device sends information about the first resource set group and information about the second resource set group to the user equipment.

In the foregoing embodiment, a network device separately configures, for user equipment, a first resource set group of a physical downlink control channel set and a second resource set group of a physical control channel for retransmission, where the physical control channel for retransmission is a physical control channel for retransmission corresponding to downlink data indicated by a physical control channel in at least one subset of the physical control channel set, so that the UE can detect, in the preconfigured first resource set group and second resource set group, a physical downlink control channel used for initial transmission and the physical downlink control channel used for retransmission. In this way, in an HARQ process, the UE can obtain a coordination gain of multiple resources by using multiple preconfigured transmission resources (including resources in the first resource set group and the second resource set group). Therefore, in this embodiment of the present invention, a coordination gain can still be implemented only with a need of semi-static configuration and without a need of quick information exchange. In addition, the network device separately preconfigures, for the user equipment, the first resource set group that is of the physical downlink control channel set and used for initial transmission and the second resource set group used for retransmission, which reduces complexity of blind detection, which the UE performs when obtaining a coordination gain, on the physical downlink control channel for retransmission.

It should be noted that this embodiment of the present invention is described by using a first network device and a second network device as examples; however, this embodiment of the present invention may be applied to a case of only one network device, for example, a case in which there is only a first network device. In this case, a first module and a second module in the network device perform corresponding processing, for which reference is made to descriptions in this embodiment of the present invention. For brevity, details are not described again.

In the foregoing embodiment, the first network device, such as a base station 0 or a base station 1 shown in FIG. 1, is a device responsible for configuring the first resource set group of the physical downlink control channel set for the user equipment (UE for short), and may be, or may not be a device responsible for transmitting downlink data to the UE. However, during specific implementation, alternatively, the first network device may be another type of network device except the base station. The first resource set group includes a resource of a physical downlink control channel set corresponding to to-be-initially-transmitted downlink data.

In an example of this step, the base station 0 may send the information about the first resource set group. For example, the base station 0 notifies the UE of the semi-static information of the first resource set group by using higher layer signaling, so that the first resource set group is preconfigured for the UE. Certainly, in a specific embodiment, alternatively, the base station 1 may perform the sending, and the like. In this case, the base station 1 is a device responsible for configuring the first resource set group of the physical downlink control channel set for the UE.

The physical downlink control channel set includes a physical downlink control channel that may be used for the to-be-initially-transmitted downlink data.

The information about the first resource set group may be resource set information required by the UE for detecting a physical downlink control channel in the physical downlink control channel set. For example, the information about the first resource set group may include time-frequency resource configuration information of the physical downlink control channel set corresponding to the to-be-initially-transmitted downlink data, and the physical downlink control channel in the physical downlink control channel set may be a physical downlink control channel (PDCCH for short) or an enhanced physical downlink control channel (EPDCCH for short). One resource set group may include one or more resource sets, and therefore, is referred to as one group. One resource set may include time-frequency resources used by the one or more physical downlink control channels. For example, one resource set corresponding to an EPDCCH may include one or more physical resource blocks or physical resource block pairs (PRB Pair for short), and one physical resource block pair includes two physical resource blocks in one subframe. Information about one resource set may include a time-frequency resource and/or a scrambling code used by a physical downlink control channel corresponding to the set. Scrambling codes of physical downlink control channels corresponding to different resource sets may be different. The UE may detect the physical downlink control channel in the physical downlink control channel set according to the information about the first resource set group, so as to implement receiving of control information corresponding to downlink data.

The physical downlink control channel for retransmission is a physical downlink control channel used for retransmission. For example, the base station 0 may notify the UE of the information about the second resource set group by using higher-layer signaling. In this case, according to the information about the second resource set group, the UE may detect, on resources in the preconfigured second resource set group, the physical downlink control channel for retransmission, for example, detect all candidate physical downlink control channels of the UE. Certainly, in a specific embodiment, alternatively, the base station 1 may perform the sending, and the like.

The information about the second resource set group may include time-frequency resource configuration information of the physical downlink control channel corresponding to retransmission of the downlink data, where the physical downlink control channel may be a PDCCH or an EPDCCH. The UE may detect, according to the information about the second resource set group, the physical downlink control channel for retransmission, for example, detect the candidate physical downlink control channel of the UE. In a specific embodiment, the second resource set group may be included in the first resource set group, that is, the second resource set group may be a subset of the first resource set group. Alternatively, the second resource set group may intersect with the first resource set group, or the second resource set group and the first resource set group may be mutually independent resource sets, that is, the second resource set group does not intersect with the first resource set group.

Optionally, in an embodiment, the following may be further included: The information about the second resource set group may include a correspondence, and the correspondence is a correspondence between the physical downlink control channel in the at least one subset and the second resource set group or a correspondence between the at least one subset and the second resource set group. In this case, after subsequently receiving at least one physical downlink control channel in the at least one subset of the physical downlink control channel set, the UE may determine the second resource set group according to the correspondence and the at least one received physical downlink control channel.

Optionally, information about the correspondence may include a cell radio network temporary identifier (C-RNTI for short) used by the physical downlink control channel in the at least one subset. The at least one subset is determined according to information about the cell radio network temporary identifier. That is, a subset formed by the physical downlink control channel that is in the physical downlink control channel set and has the C-RNTI is corresponding to the second resource set group. The C-RNTI is identification information of 16 bits that is scrambled in a cyclic redundancy code (CRC for short) of 16 bits. In this case, the UE may detect a physical downlink control channel on a resource in the first resource set group by using the C-RNTI. At an assumption that a physical downlink control channel that belongs to the UE is detected by using the C-RNTI, the UE may determine, according to the correspondence and the received physical downlink control channel, that the physical downlink control channel for retransmission corresponding to retransmission of the downlink data is in the second resource set group. At an assumption that a physical downlink control channel that belongs to the UE is detected not by using this C-RNTI, but by using another C-RNTI, the UE may determine that the control channel corresponding to retransmission of the downlink data is not in the second resource set group of the physical downlink control channel for retransmission, and may still be in the first resource set group of the physical downlink control channel set.

Optionally, in another embodiment, in addition to the C-RNTI used by the physical downlink control channel in the at least one subset, the correspondence of which the UE is notified may further include a downlink control information (DCI for short) format used by the physical downlink control channel in the at least one subset, a scrambling code used by the physical downlink control channel, and the like. That is, the at least one subset is determined by using the method, and the at least one subset is corresponding to the second resource set group.

Optionally, the physical downlink control channel in the at least one subset further indicates the second resource set group. For example, bit information in the DCI of the physical downlink control channel is predefined to indicate whether the control channel for retransmission belongs to the first resource set or the second resource set group, that is, the DCI includes resource set indication information.

Optionally, for the physical downlink control channel in the at least one subset, the first network device may further notify the user equipment of configuration information of a physical uplink control channel and/or transmit power configuration information of the physical uplink control channel, where the physical uplink control channel is used to carry acknowledgement information of the downlink data indicated by the physical downlink control channel This step may be executed before or after any step in this embodiment. The at least one subset may be determined by using a specific C-RNTI. That is, the first network device may notify a specific C-RNTI to determine at least one subset, that is, a physical downlink control channel that is in the physical downlink control channel set and has the C-RNTI forms the at least one subset.

The transmit power configuration information of the configuration information of the physical uplink control channel is used by the UE to determine resource information of the corresponding physical uplink control channel that carries the to-be-initially-transmitted downlink data, the transmit power configuration information of the physical uplink control channel is used by the UE to determine transmit power information of the physical uplink control channel, and the physical uplink control channel is used to carry the acknowledgement information. For example, the configuration information of the physical uplink control channel may include resource configuration information of a physical uplink shared channel (PUSCH for short) that carries an uplink control information (UCI for short) or a physical uplink control channel (PUCCH for short). At an assumption that the base station 1 receives the acknowledgement information and is responsible for retransmission, the base station 0 may also notify the base station 1 of the resource configuration information of the PUSCH that carries the UCI or the PUCCH, so that the base station 1 receives the acknowledgement information according to the resource configuration information. For another example, the transmit power configuration information of the physical uplink control channel may include power configuration information of the PUSCH that carries the UCI or the PUCCH, so that the UE sends the acknowledgement information according to the transmit power configuration information.

Further, the foregoing embodiment may further include the following step:

Optionally, for the physical downlink control channel in the at least one subset, the network device further notifies the user equipment of the transmit power configuration information of the physical uplink control channel. For example, the base station 0 notifies the UE of the transmit power configuration information of the physical uplink control channel by using higher layer signaling. Certainly, in a specific embodiment, alternatively, the base station 1 may perform the sending, and the like. This embodiment imposes no limitation on an execution sequence between this step and other steps. For example, the transmit power configuration information of the physical uplink control channel may be sent when the configuration information of the physical uplink control channel is sent, or may be sent before or after the configuration information of the physical uplink control channel is sent.

Optionally, the configuration information of the physical uplink control channel may also be used by the UE to determine a base station to which the acknowledgement information is to be fed back or a base station that receives the resource information, or may be used by the UE to determine a base station responsible for retransmission.

Optionally, for the physical downlink control channel in the at least one subset, the network device notifies the user equipment of one group of common reference signal (CRS for short) rate matching information, and at least one piece of CRS rate matching information in the group of CRS rate matching information includes at least two pieces of CRS pattern information.

There is a correspondence between the group of CRS rate matching information and the physical downlink control channel set, that is, the group of CRS rate matching information is corresponding to the downlink data indicated by the at least one physical downlink control channel received by the UE, so that the UE implements receiving of the downlink data. One group of CRS rate matching information may include one or more pieces of CRS rate matching information. One piece of CRS rate matching information may indicate one or more pieces of CRS pattern information. A piece of CRS rate matching information of a downlink data channel may be used for resource mapping of a data channel, so that a resource element occupied by an indicated CRS pattern is not used for resource mapping of the data channel. When the group of CRS rate matching information corresponding to the physical downlink control channel includes multiple pieces of CRS rate matching information, a piece of CRS rate matching information used for a data channel may be indicated in the physical downlink control channel, for example, is indicated in a bit field of a physical downlink shared channel resource element mapping and quasi-co-location indicator PQI (PDSCH RE mapping and Quasi-co-location Indicator) on the physical downlink control channel. At least one piece of CRS rate matching information in the group of CRS rate matching information is used for rate matching for the downlink data indicated by the physical downlink control channel in the at least one subset.

It should be noted that the CRS rate matching information includes, for example, CRS information used to indicate a CRS pattern. For example, at least one piece of CRS rate matching information of one group of CRS rate matching information includes at least two pieces of CRS pattern information. In addition, at an assumption that as shown in FIG. 1, the base station 0 and the base station 1 jointly transmit data to the UE, the piece of CRS rate matching information may include, for example, CRS information respectively corresponding to the two devices, that is, the base station 0 and the base station 1. For another example, if the UE fails to receive data, at an assumption that the base station 0 needs to retransmit the data to the UE, the piece of CRS rate matching information may include CRS information corresponding to the base station 0.

According to the information configuration method in this embodiment of the present invention, a first network device separately configures, for user equipment, a first resource set group that is of a physical downlink control channel set and used for initial transmission and a second resource set group used for retransmission, so that the UE can detect, in the preconfigured first resource set group and second resource set group, a physical downlink control channel used for initial transmission and a physical downlink control channel used for retransmission. In this way, in a hybrid automatic repeat request (Hybrid Automatic Repeat Request, HARQ for short) process, the UE can obtain a coordination gain of multiple resources by using multiple preconfigured transmission resources (including resources in the first resource set group and the second resource set group). In addition, the first network device separately preconfigures, for the user equipment, the first resource set group that is of the physical downlink control channel set and used for initial transmission and the second resource set group used for retransmission, which reduces complexity of blind detection, which the UE performs when obtaining a coordination gain, on the physical downlink control channel for retransmission.

Optionally, as shown in FIG. 2*a*, Embodiment 1 described above may further include the following step:

203. The first network device sends at least one physical downlink control channel of the physical downlink control channel in the at least one subset to the user equipment, where the at least one physical downlink control channel carries first control information, and the first control information includes scheduling information of the downlink data; and/or a second network device sends at least one physical downlink control channel of the physical downlink control channel in the at least one subset to the user equipment, where the at least one physical downlink control channel carries first control information, the first control information includes scheduling information of the downlink data, and the second network device is controlled by the first network device.

In this step, at least one of the first network device and the second network device may send the physical downlink control channel to the user equipment, so that the downlink data is transmitted to the user equipment. In this case, the user equipment can receive the data from the at least one network device by using the preconfigured first resource set group.

For example, if the foregoing step is executed by the base station 0, in this step, the base station 0 may send, to the UE, the at least one physical downlink control channel in the at least one subset of the physical downlink control channel set in the first resource set group, and the UE may receive, on the physical downlink control channel, the first control information corresponding to the downlink data, where the first control information includes the scheduling information of the downlink data. Alternatively, if the foregoing step is executed by the base station 1, in this step, the base station 1 may send, to the UE, the at least one physical downlink control channel in the at least one subset of the physical downlink control channel set in the first resource set group. Alternatively, if the foregoing step is executed by both the base station 0 and the base station 1, in this step, the base station 0 and the base station 1 may send, to the UE, the at least one physical downlink control channel in the at least one subset of the physical downlink control channel set in the first resource set group. When the foregoing step is executed by both the base station 0 and the base station 1, the base station 0 and the base station 1 need to use a same transmission manner of the physical downlink control channel and carry same DCI, so as to perform transmission, where the same transmission manner and the same DCI are coordinated in advance. After this step, the UE may receive, according to the at least one received physical downlink control channel, the initially transmitted downlink data.

Specifically, the scheduling information of the downlink data may include one or more of downlink data resource configuration information, modulation and coding manner information, and an HARQ process number. In a specific embodiment, as described in step 202, the scheduling information of the downlink data may further include resource set indication information, and the UE may determine the second resource set group according to the resource set indication information.

In addition, after the first network device notifies the UE of the CRS rate matching information, the first network device may perform, according to the CRS rate matching information by using the at least one piece of CRS rate matching information in the group of CRS rate matching information, rate matching on the downlink data indicated by the physical downlink control channel in the at least one subset, and then transmit the downlink data to the user equipment. For example, if the first network device is one of at least two devices that jointly transmit data, the first network device delivers information about the first resource set group to the UE, the first network device delivers the group of CRS rate matching information to the UE, and the second network device and the first network device jointly transmit the downlink data to the UE. The second network device refers to another network device that transmits data together with the first network device, and this embodiment imposes no limitation on a quantity of second network devices.

For example, in the scenario, shown in FIG. 1, in which the base station 0 and the base station 1 jointly transmit data to the UE, the base station 0 may notify the UE of one group of CRS rate matching information, where the group of CRS rate matching information includes CRS information respectively corresponding to the base station 0 and the base station 1; in addition, the base station 0 and the base station 1 transmit the downlink data to the UE according to the group of CRS rate matching information, and the UE receives the downlink data according to the group of received CRS rate matching information.

By using this step, it can be implemented that in a non-ideal backhaul case, for initial transmission, data may be sent to the UE in a coordinated manner, so that reliability of data sending is higher.

Optionally, Embodiment 1 described above may further include the following step:

204. After the first network device sends the at least one physical downlink control channel of the physical downlink control channel in the at least one subset to the user equipment, the following is further included: If the second network device receives negative acknowledgement information sent by the user equipment, the second network device sends, to the user equipment, at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission; or after the second network device sends the at least one physical downlink control channel of the physical downlink control channel in the at least one subset to the user equipment, the following is further included: if the first network device receives negative acknowledgement information sent by the user equipment, the first network device sends, to the user equipment, the at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission.

In this step, after receiving the configuration information of the physical uplink control channel, UE may send acknowledgement information on a corresponding resource. The first network device or the second network device receives the acknowledgement information on the corresponding resource. Therefore, it can be implemented that if downlink data is sent by the first network device, the second network device may implement retransmission (that is, the second network device receives the NACK), and vice versa, or if downlink data is sent by the first network device and the second network device together, any network device that receives the NACK may implement retransmission. Therefore, the first network device or the second network device can perform data retransmission according to a preconfiguration, instead of performing coordination in an aspect of data transmission with quick information exchange.

It should be noted that in this embodiment of the present invention, configurations such as the first resource set group, the second resource set group, the transmit power configuration information of the physical uplink control channel, the transmit power configuration information of the physical uplink control channel, and the group of CRS rate matching information may change. If a change occurs, configuration is performed again according to the method in this embodiment of the present invention. For example, if the second resource set group changes, the first network device sends, to the user equipment, changed information about the second resource set group. A case for the first resource set group is similar to that for the second resource set group.

Embodiment 2

FIG. 3 is a schematic flowchart of an embodiment of a data receiving method according to the present invention. The method may be executed by user equipment. It should be noted that for specific descriptions of same content in this embodiment as that in Embodiment 1, reference may be made to descriptions in Embodiment 1, and this embodiment gives only brief descriptions. As shown in FIG. 3, the method may include the following steps:

301. User equipment receives at least one physical downlink control channel according to information about a first resource set group sent by a first network device, acquires first control information carried on the at least one physical downlink control channel, and receives downlink data according to scheduling information that is of the downlink data and included in the first control information, where the first resource set group is a resource set that is of a physical downlink control channel set and preconfigured by the first network device for the user equipment, and the at least one physical downlink control channel is a physical downlink control channel in at least one subset of the physical downlink control channel set.

In this step, with reference to a scenario shown in FIG. 1, the at least one physical downlink control channel received by the user equipment may be sent, for example, by a base station 0, or by a base station 1, or by a base station 0 and a base station 1. The scheduling information of the downlink data may include one or more of downlink data resource configuration information, modulation and coding manner information, and an HARQ process number, and is used by the user equipment to receive the downlink data.

Further, before the user equipment receives the downlink data according to the scheduling information that is of the downlink data and included in the first control information, for the physical downlink control channel in the at least one subset, the user equipment further receives one group of common reference signal CRS rate matching information notified by the first network device, where at least one piece of CRS rate matching information in the group of CRS rate matching information includes at least two pieces of CRS pattern information. In this case, the user equipment may perform, by using the at least one piece of CRS rate matching information in the group of CRS rate matching information, rate matching on the downlink data indicated by the physical downlink control channel in the at least one subset, and then receive the downlink data. A piece of CRS rate matching information of a downlink data channel may be used for resource mapping of a data channel, so that a resource element occupied by an indicated CRS pattern is not used for resource mapping of the data channel.

302. The user equipment detects, in a second resource set group corresponding to information about the second resource set group sent by the first network device, a physical downlink control channel for retransmission corresponding to the downlink data, where the second resource set group is a resource set that is of the physical downlink control channel for retransmission and preconfigured by the first network device for the user equipment.

The second resource set group is a resource set that is of the physical downlink control channel for retransmission and preconfigured by the first network device for the user equipment. For example, in this embodiment, both the information that is about the first resource set group and received by the user equipment in step 301 and the information about the second resource set group in this step may be sent by the first network device. For example, with reference to the scenario shown in FIG. 1, the information about the first resource set group and the information about the second resource set group may be sent by the base station 0 or the base station 1 to the user equipment, or certainly, may be sent by another device.

Further, before detecting, in the second resource set group, the physical downlink control channel for retransmission corresponding to the downlink data, the user equipment needs to determine, according to the at least one received physical downlink control channel and a correspondence, the second resource set group corresponding to retransmission of the downlink data, where the correspondence is included in the information about the second resource set group, and is a correspondence between the physical downlink control channel in the at least one subset and the second resource set group, or the correspondence is a correspondence between the subset of the physical downlink control channel set and the second resource set group.

The user equipment may determine, according to the correspondence and the at least one received physical downlink control channel, the second resource set group corresponding to the retransmission of the downlink data.

Optionally, the user equipment may determine, according to an indication in the at least one received physical downlink control channel, the second resource set group corresponding to retransmission of the downlink data.

Further, for the physical downlink control channel in the at least one subset, the user equipment further receives configuration information that is of a physical uplink control channel and notified by the first network device. After the user equipment receives the downlink data according to the scheduling information of the downlink data, the user equipment determines, according to the configuration information of the physical uplink control channel, resource information of the physical uplink control channel corresponding to the downlink data, and sends acknowledgement information of the downlink data according to the resource information of the physical uplink control channel.

For example, if the acknowledgement information is negative acknowledgement information, the user equipment receives, according to the information about the second resource set group, at least one of the physical downlink control channel that is for retransmission and in the second resource set group, where the physical downlink control channel for retransmission carries second control information.

The user equipment receives retransmitted downlink data according to scheduling information included in the second control information, where the scheduling information is scheduling information of the downlink data corresponding to the physical downlink control channel for retransmission. The retransmitted downlink data is retransmission corresponding to the downlink data indicated by the physical control channel in the at least one subset of the physical control channel set.

Optionally, before the user equipment sends the acknowledgement information of the downlink data according to the resource information of the physical uplink control channel, for the physical downlink control channel in the at least one subset, the user equipment receives transmit power configuration information that is of the physical uplink control channel and notified by the first network device. In this case, the user equipment determines transmit power information of the physical uplink control channel according to the transmit power configuration information, and sends the acknowledgement information of the downlink data according to the resource information and the transmit power information of the physical uplink control channel.

More specifically, the foregoing transmit power configuration information received by the user equipment may include reference signal power. Specifically, the user equipment may determine a downlink path loss estimate according to the reference signal power, determine transmit power of the physical uplink control channel according to the downlink path loss estimate, and send the acknowledgement information of the downlink data according to the resource information and the transmit power of the physical uplink control channel.

In the foregoing embodiment, a network device separately configures, for user equipment, a first resource set group of a physical downlink control channel set and a second resource set group of a physical control channel for retransmission, where the physical control channel for retransmission is a physical control channel for retransmission corresponding to downlink data indicated by a physical control channel in at least one subset of the physical control channel set, so that the UE can detect, in the preconfigured first resource set group and second resource set group, a physical downlink control channel used for initial transmission and the physical downlink control channel used for retransmission. In this way, in an HARQ process, the UE can obtain a coordination gain of multiple resources by using multiple preconfigured transmission resources (including resources in the first resource set group and the second resource set group). Therefore, in this embodiment of the present invention, a coordination gain can still be implemented only with a need of semi-static configuration and without a need of quick information exchange. In addition, the network device separately preconfigures, for the user equipment, the first resource set group that is of the physical downlink control channel set and used for initial transmission and the second resource set group used for retransmission, which reduces complexity of blind detection, which the UE performs when obtaining a coordination gain, on the physical downlink control channel for retransmission.

Embodiment 3

Figure 4:
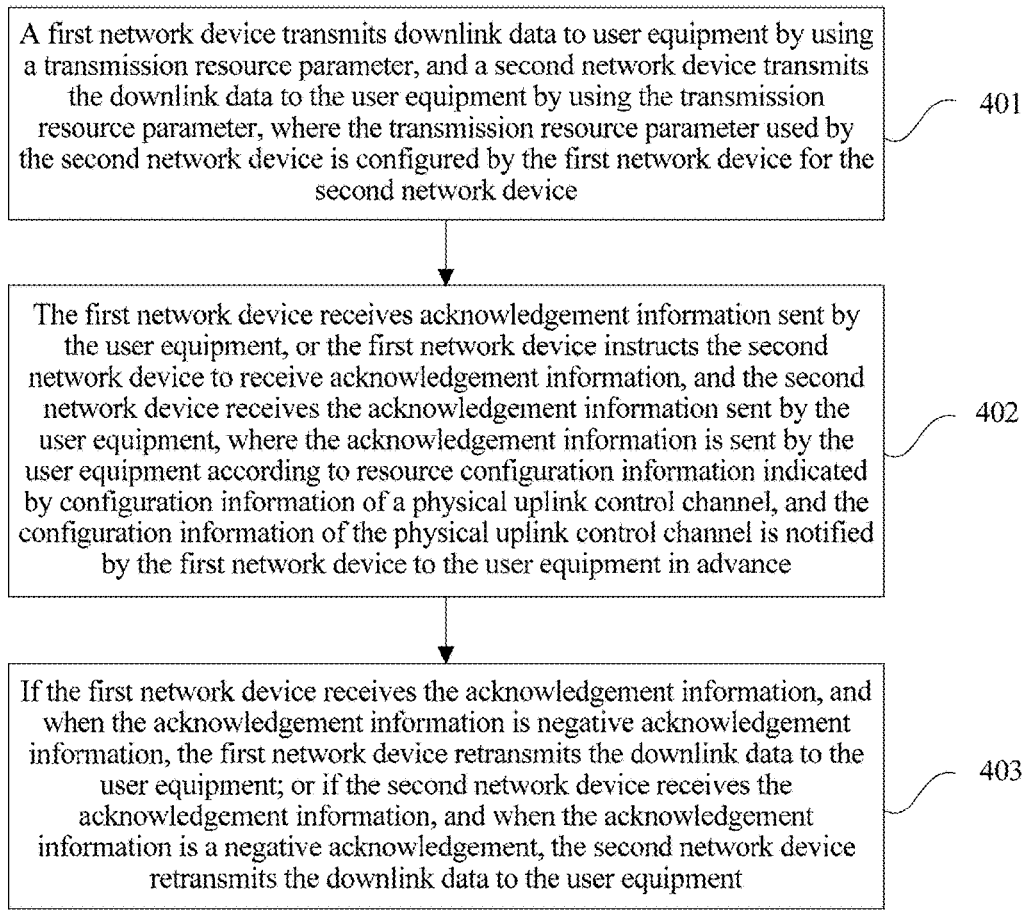
FIG. 4 is a schematic flowchart of an embodiment of a data transmission method according to the present invention.

FIG. 4 is a schematic flowchart of an embodiment of a data transmission method according to the present invention. This embodiment provides a data transmission method, so that in a non-ideal backhaul scenario, at least two network devices can send data to user equipment in a coordinated manner to obtain a coordination gain. It should be noted that for descriptions of terms in this embodiment, reference may be made to descriptions of the same terms in the foregoing embodiments, and details are not described again in this embodiment. This embodiment illustrates an exemplary scenario, as shown in a scenario in FIG. 1. A base station 0 (which may be referred to as a first network device) and a base station 1 (which may be referred to as a second network device) jointly transmit downlink data to UE, and the base station 0 sends one group of CRS rate matching information to the UE, where the group of CRS rate matching information includes CRS information respectively corresponding to the base station 0 and the base station 1.

401. The first network device transmits downlink data to the user equipment by using a transmission resource parameter, and the second network device transmits the downlink data to the user equipment by using the transmission resource parameter, where the transmission resource parameter used by the second network device is configured by the first network device for the second network device.

The transmission resource parameter in this embodiment may include at least one of a physical resource used for transmitting the downlink data, a modulation and coding manner, a data block size, a time at which a data block is sent, and an HARQ process number each time a data block is sent. The first network device and the second network device may send the downlink data to the user equipment according to information included in the transmission resource parameter.

Optionally, the downlink data may include data carried on a physical downlink shared channel and/or data carried on a physical downlink control channel.

Optionally, in this step, when transmitting the downlink data to the user equipment by using the transmission resource parameter, the first network device and the second network device may specifically execute the following in the following manner transmitting, by the first network device and the second network device, the downlink data to the user equipment according to CRS rate matching information and the transmission resource parameter, where the CRS rate matching information based on which the second network device performs transmission is preconfigured by the first network device for the second network device, and for details, reference may be made to descriptions in the foregoing embodiments.

Specifically, the scenario shown in FIG. 1 is used as an example. The system includes two network devices that jointly transmit data to the UE, such as the base station 0 and the base station 1. The base station 0 may be a main control base station, the base station 1 is a serving base station, and the main control base station is responsible for controlling the two serving base stations.

When the at least two network devices jointly transmit the data to the UE, the at least two network devices transmit, at at least one subframe, the same downlink data to the UE by using same transmission resource parameter information, so that the downlink data is jointly transmitted to the UE. Further, before the first network device and the second network device transmit, at the at least one subframe, the same downlink data to the user equipment by using the same transmission resource parameter information, the method further includes: receiving, by the second network device, the transmission resource parameter information notified by the first network device. For example, the transmission resource parameter information may be determined by the base station 0. In this case, there may be only the base station 0 and the base station 1, the base station 0 is a main control base station, and the base station 0 notifies the base station 1 of the transmission resource parameter information in advance.

Certainly, in this embodiment, alternatively, the downlink data may be transmitted by only one of the first network device and the second network device to the UE.

402. The first network device receives acknowledgement information sent by the user equipment, or the first network device instructs the second network device to receive acknowledgement information, and the second network device receives the acknowledgement information sent by the user equipment, where the acknowledgement information is sent by the user equipment according to resource configuration information indicated by configuration information of a physical uplink control channel, and the configuration information of the physical uplink control channel is notified by the first network device to the user equipment in advance.

The configuration information of the physical uplink control channel is used to indicate, for the user equipment, the resource configuration information for sending the acknowledgement information corresponding to the downlink data.

In the foregoing solution, by means of interaction between the first network device and the second network device, in a non-ideal backhaul case, for initial transmission, data may be sent to the UE in a coordinated manner, so that reliability of data sending is higher. If only one of the first network device and the second network device performs initial transmission, by using the method in this embodiment of the present invention, the first network device notifies the user equipment of configuration information of a physical uplink control channel in advance, and a transmission point for initial transmission may be different from a transmission point for retransmission.

Further, that the first network device instructs the second network device to receive acknowledgement information may include: notifying, by the first network device, the second network device of the configuration information of the uplink control channel resource that carries the acknowledgement information. For example, a main control base station may also separately notify the UE and a base station that is responsible for retransmission, such as the base station 1, of the configuration information of the uplink control channel resource that carries the acknowledgement information. In this case, the UE may send, according to the configuration information, the acknowledgement information corresponding to the downlink data, and the base station 1 also knows that resource information of the acknowledgement information corresponding to the downlink data is to be received by the base station 1. If the acknowledgement information fed back by the UE is a NACK, the base station 1 retransmits the downlink data to the UE.

403. If the first network device receives the acknowledgement information, and when the acknowledgement information is negative acknowledgement information, the first network device retransmits the downlink data to the user equipment; or if the second network device receives the acknowledgement information, and when the acknowledgement information is a negative acknowledgement, the second network device retransmits the downlink data to the user equipment.

Specifically, that the first network device retransmits the downlink data to the user equipment may include: if the first network device receives the negative acknowledgement information sent by the user equipment, sending, by the first network device to the user equipment, at least one physical downlink control channel for retransmission, where the at least one physical downlink control channel for retransmission carries second control information, and the second control information includes scheduling information of downlink data corresponding to the at least one physical downlink control channel for retransmission; and retransmitting the downlink data to the user equipment according to the scheduling information; or similarly, that the second network device retransmits the downlink data to the user equipment may include: if the second network device receives the negative acknowledgement information sent by the user equipment, sending, by the second network device to the user equipment, at least one physical downlink control channel for retransmission, where the at least one physical downlink control channel for retransmission carries second control information, and the second control information includes scheduling information of downlink data corresponding to the at least one physical downlink control channel for retransmission.

If initial transmission is executed only by the first network device (that is, step 401), and retransmission is executed by the second network device (that is, step 403), the first network device configures, for the second network device, same downlink data initially transmitted by the first network device. The first network device knows a moment at which retransmission occurs; therefore, it is only required to ensure that configuration is complete before retransmission occurs.

If initial transmission is executed only by the second network device (that is, step 401), and retransmission is executed by the first network device (that is, step 403), because the first network device is a main control network device, the first network device knows downlink data initially transmitted by the second network device. Therefore, in this case, the first network device can implement retransmission.

Optionally, before the first network device and the second network device transmit, at the at least one subframe, the same downlink data to the user equipment by using the same transmission resource parameter information, the method may further include: receiving, by the second network device, one group of CRS rate matching information sent by the first network device, so that the second network device determines, according to the CRS rate matching information, CRS information corresponding to transmission of the downlink data.

In the foregoing solution, the transmission point used for initial transmission may be different from the transmission point used for retransmission; therefore, in a non-ideal backhaul case, for initial transmission, data may be sent to the UE in a coordinated manner, so that reliability of data sending is higher.

Embodiment 4

Figure 5:
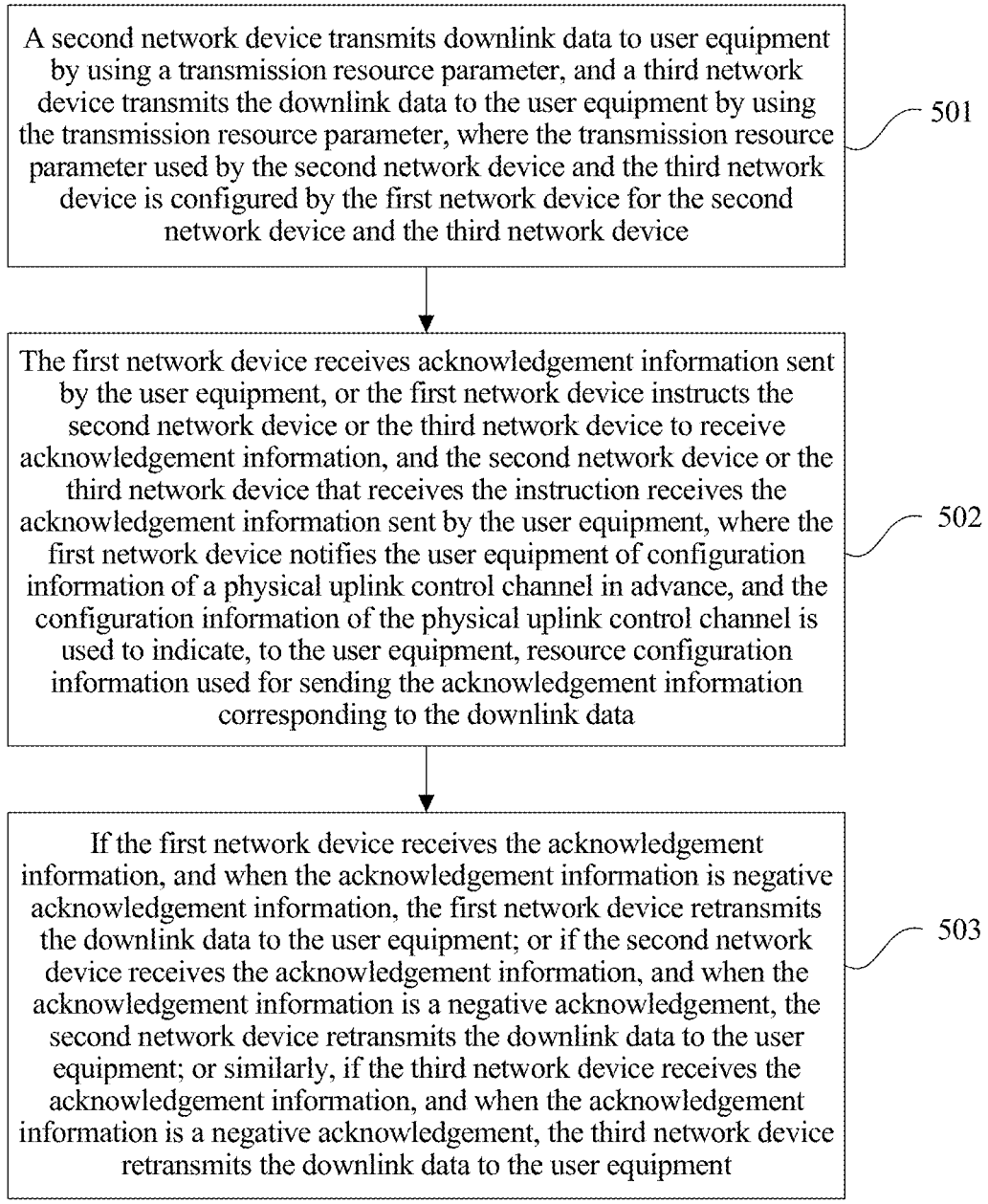
FIG. 5 is a schematic flowchart of another embodiment of a data transmission method according to the present invention.

FIG. 5 is a schematic flowchart of another embodiment of a data transmission method according to the present invention. This embodiment provides a data transmission method, so that in a non-ideal backhaul scenario, at least two network devices can send data to user equipment in a coordinated manner to obtain a coordination gain. It should be noted that for descriptions of terms in this embodiment, reference may be made to descriptions of the same terms in the foregoing embodiments, and details are not described again in this embodiment. In a scenario illustrated in this embodiment, a base station 0 (which may be referred to as a first network device) is used as a main control network device, a base station 1 (which may be referred to as a second network device) and a base station 2 (which may be referred to as a third network device) jointly transmit downlink data to UE, and the base station 0 sends one group of CRS rate matching information to the UE, where the group of CRS rate matching information includes CRS information respectively corresponding to the base station 1 and the base station 2. It should be noted that for brevity, for related descriptions and specific details in this embodiment, reference may be made to descriptions in the foregoing embodiments.

501. The second network device transmits downlink data to the user equipment by using a transmission resource parameter, and the third network device transmits the downlink data to the user equipment by using the transmission resource parameter, where the transmission resource parameter used by the second network device and the third network device is configured by the first network device for the second network device and the third network device.

When the second network device and the third network device jointly transmit the data to the UE, the second network device and the third network device transmit, at at least one subframe, the same downlink data to the UE by using same transmission resource parameter information, so that the downlink data is jointly transmitted to the UE. Further, before the second network device and the third network device transmit, at the at least one subframe, the same downlink data to the user equipment by using the same transmission resource parameter information, the method further includes: receiving, by the second network device and the third network device, the transmission resource parameter information notified by the first network device. For example, the base station 1 and the base station 2 are notified of the transmission resource parameter information by the base station 0.

Certainly, in this embodiment, alternatively, the downlink data may be transmitted by only one of the second network device and the third network device to the UE.

502. The first network device receives acknowledgement information sent by the user equipment, or the first network device instructs the second network device or the third network device to receive acknowledgement information, and the second network device or the third network device that receives the instruction receives the acknowledgement information sent by the user equipment, where the first network device notifies the user equipment of configuration information of a physical uplink control channel in advance, and the configuration information of the physical uplink control channel is used to indicate, for the user equipment, resource configuration information for sending the acknowledgement information corresponding to the downlink data.

In the foregoing solution, by means of interaction between network devices, in a non-ideal backhaul case, for initial transmission, data may be sent to the UE in a coordinated manner, so that reliability of data sending is higher. In addition, by using the method in this embodiment of the present invention, the first network device notifies the user equipment of the configuration information of the physical uplink control channel in advance, so that a transmission point for initial transmission may be different from a transmission point for retransmission.

Further, that the first network device instructs the second network device or the third network device to receive acknowledgement information may include: notifying, by the first network device, the second network device or the third network device of the configuration information of the uplink control channel resource that carries the acknowledgement information. For example, a main control base station may also separately notify the UE and a base station that is responsible for retransmission, such as the base station 1, of the configuration information of the uplink control channel resource that carries the acknowledgement information. In this case, the UE may send, according to the configuration information, the acknowledgement information corresponding to the downlink data, and the base station 1 also knows that resource information of the acknowledgement information corresponding to the downlink data is to be received by the base station 1. If the acknowledgement information fed back by the UE is a NACK, the base station 1 retransmits the downlink data to the UE.

503. If the first network device receives the acknowledgement information, and when the acknowledgement information is negative acknowledgement information, the first network device retransmits the downlink data to the user equipment; or if the second network device receives the acknowledgement information, and when the acknowledgement information is a negative acknowledgement, the second network device retransmits the downlink data to the user equipment; or similarly, if the third network device receives the acknowledgement information, and when the acknowledgement information is a negative acknowledgement, the third network device retransmits the downlink data to the user equipment.

Specifically, that the first network device retransmits the downlink data to the user equipment may include: if the first network device receives the negative acknowledgement information sent by the user equipment, sending, by the first network device to the user equipment, at least one physical downlink control channel for retransmission, where the at least one physical downlink control channel for retransmission carries second control information, and the second control information includes scheduling information of downlink data corresponding to the at least one physical downlink control channel for retransmission; and retransmitting the downlink data to the user equipment according to the scheduling information; or similarly, that the second network device retransmits the downlink data to the user equipment may include: if the second network device receives the negative acknowledgement information sent by the user equipment, sending, by the second network device to the user equipment, at least one physical downlink control channel for retransmission, where the at least one physical downlink control channel for retransmission carries second control information, and the second control information includes scheduling information of downlink data corresponding to the at least one physical downlink control channel for retransmission. A case for the third network device is similar to the foregoing case, and details are not described herein again.

If initial transmission is executed only by the second network device (that is, step 501), and retransmission is executed by the third network device (that is, step 503), because the first network device is a main control network device, the first network device knows downlink data initially transmitted by the second network device, and the first network device configures, for the third network device, the downlink data initially transmitted by the second network device, so that the third network device performs retransmission. The first network device knows a moment at which retransmission occurs; therefore, it is only required to ensure that configuration is complete before retransmission occurs.

If initial transmission is executed only by the third network device (that is, step 501), and retransmission is executed by the first network device (that is, step 503), because the first network device is a main control network device, the first network device knows downlink data initially transmitted by the third network device. Therefore, in this case, the first network device can implement retransmission.

Optionally, before the second network device and the third network device transmit, at the at least one subframe, the same downlink data to the user equipment by using the same transmission resource parameter information, the method may further include: receiving, by the second network device and/or the third network device, one group of CRS rate matching information sent by the first network device, so that the second network device and the third network device determine, according to the CRS rate matching information, CRS information corresponding to transmission of the downlink data.

Embodiment 5

Figure 6:
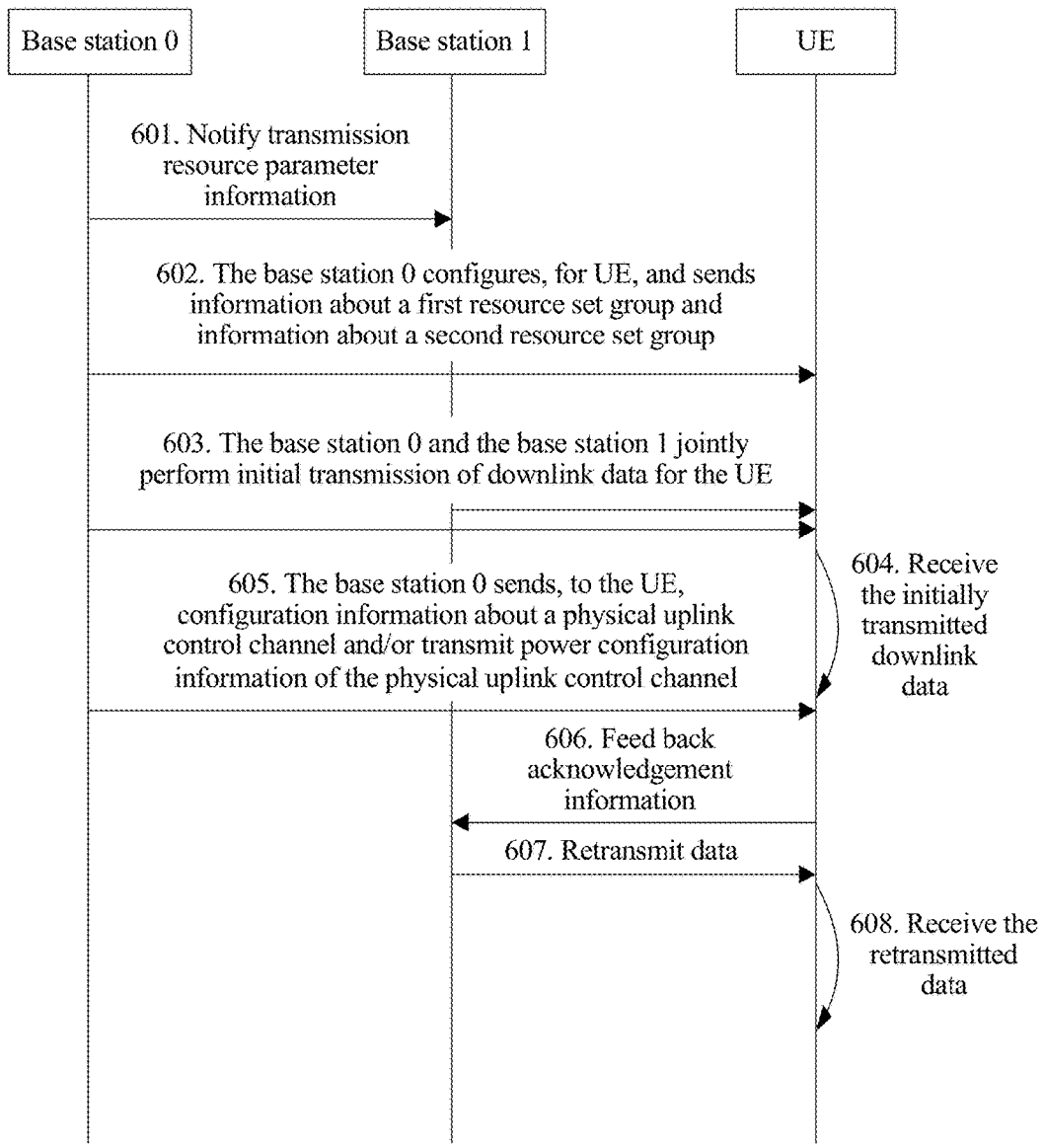
FIG. 6 is a schematic signaling diagram of another embodiment of an information configuration method according to the present invention.

To understand embodiments of the present invention more clearly, a manner of implementing signaling exchange is provided in this embodiment, but is not used to limit the foregoing embodiments. FIG. 6 is a schematic signaling diagram of another embodiment of an information configuration method according to the present invention. FIG. 6 shows an optional procedure for transmitting data between a base station and UE, and a scenario shown in FIG. 1 is used as an example, where the UE, a base station 0, and a base station 1 are included. The method includes the following steps:

601. The base station 0 notifies the base station 1 of determined transmission resource parameter information.

In this embodiment, it is assumed that there are only two base stations, that is, the base station 0 and the base station 1, and the base station 0 is a main control base station. Therefore, the base station 0 determines the transmission resource parameter information, which includes, for example, a parameter such as a physical resource used for transmitting the downlink data, a modulation and coding manner, a data block size, a time at which a data block is sent, an HARQ process (HARQ Process) number each time a data block is sent, a virtual cell identity (virtual cell-ID) used to generate a scrambling code sequence of a data channel, or an SPS-C-RNTI (semi-persistent-scheduling C-RNTI), and notifies the base station 1 of the information. This step is actually equivalent to parameter negotiation between the two base stations for coordinated transmission. The base station 0 configures SPS scheduling for the user equipment; therefore, the base station configures, for a user, an SPS-C-RNTI exclusive to the SPS scheduling. The base station 0 notifies the base station 1 of the SPS-C-RNTI, so that the base station 1 and the base station 0 can use the same SPS-C-RNTI to transmit a control channel for initial transmission.

602. The base station 0 configures, for the UE, a first resource set group of a physical downlink control channel set and a second resource set group of a physical downlink control channel for retransmission, and sends information about the first resource set group and information about the second resource set group to the UE.

In an example of this step, the base station 0 configures the first resource set group of the physical downlink control channel set and the second resource set group of the physical downlink control channel for retransmission, and sends the information about the first resource set group and the information about the second resource set group. For example, the base station 0 sends the semi-static information of the first resource set group and the semi-static information of the second resource set group to the UE by using higher layer signaling. Certainly, in a specific embodiment, alternatively, the base station 1 may perform the sending, and the like. This embodiment imposes no limitation on an execution sequence between this step and other steps. For example, the sending may be performed before step 601.

Downlink data indicated by a physical downlink control channel in at least one subset of the physical downlink control channel set is downlink data in step 603. The physical downlink control channel for retransmission is a physical downlink control channel for retransmission corresponding to the downlink data indicated by the physical downlink control channel in at least one subset of the physical downlink control channel set, that is, a physical downlink control channel corresponding to to-be-retransmitted data in step 607.

The information about the first resource set group may be used by the UE to detect a physical downlink control channel that is in the first resource set group of the physical downlink control channel set and corresponding to the downlink data, and the information about the second resource set group may be used by the UE to detect a physical downlink control channel that is in the second resource set group of the physical downlink control channel for retransmission and corresponding to the downlink data.

After the base station 0 configures, for the UE, the second resource set group of the physical downlink control channel for retransmission, a method for further determining the second resource set group further includes: notifying, by the base station 0, the UE of a correspondence, where the correspondence is a correspondence between the physical downlink control channel in the at least one subset and the second resource set group. The UE may determine the second resource set group according to the correspondence and at least one received physical downlink control channel in the at least one subset of the physical downlink control channel set.

Optionally, if reducing complexity of blind detection performed by the user equipment on the physical downlink control channel is not considered, the base station may not execute step 602. It may be assumed that the user equipment needs to perform blind detection, in all resource sets of physical downlink control channels, for initial transmission and retransmission in an HARQ process of the user equipment.

It should be noted that step 601 and step 602 are steps preconfigured by the base station 0, and are used merely as an example herein to describe this embodiment of the present invention; however, step 601 and step 602 do not need to be executed each time downlink data is transmitted.

603. The base station 0 and the base station 1 jointly perform initial transmission of downlink data for the UE.

Both the base station 0 and the base station 1 transmit the same downlink data to the UE according to the transmission resource parameter information determined in step 601, to implement joint transmission.

Further, when the downlink data is being transmitted, the base station 0 sends first control information to the UE, where the first control information is carried on the at least one physical downlink control channel in the at least one subset of the physical downlink control channel set, and includes scheduling information of the downlink data. In this embodiment, the first control information may further include resource set indication information, and a correspondence between the resource set indication information and the second resource set group is configured by a network device or predefined. The UE may determine the second resource set group according to the resource set indication information.

In addition, before the downlink data is transmitted, the base station 0 may notify the UE of CRS rate matching information corresponding to transmission of the downlink data this time, where the CRS rate matching information includes CRS pattern information respectively corresponding to the base station 0 and the base station 1.

604. The UE receives the initially transmitted downlink data.

Further, the UE detects the physical downlink control channel according to the information about the preconfigured first resource set group, and receives the downlink data according to the first control information carried on the detected physical downlink control channel.

605. The base station 0 sends configuration information of a physical uplink control channel and/or transmit power configuration information of the physical uplink control channel to the UE.

For the physical downlink control channel in the at least one subset, the network device notifies the user equipment of the configuration information of the physical uplink control channel and/or the transmit power configuration information of the physical uplink control channel, where the physical uplink control channel is used to carry acknowledgement information.

In an example of this step, the base station 0 sends the configuration information of the physical uplink control channel and/or the transmit power configuration information of the physical uplink control channel. For example, the base station 0 notifies the UE of the semi-static configuration information of the physical uplink control channel and/or the semi-static transmit power configuration information of the physical uplink control channel by using higher layer signaling. This embodiment imposes no limitation on an execution sequence between this step and other steps. For example, the sending may also be performed before step 603 or an earlier step.

606. The UE feeds back acknowledgement information to the base station 1.

The configuration information of the physical uplink control channel and/or the transmit power configuration information of the physical uplink control channel are mainly used by the UE to determine resource information of the corresponding physical uplink control channel that carries the initially transmitted downlink data and/or transmit power information of the physical uplink control channel that carries the acknowledgement information, or may be used by the UE to determine a base station to which the acknowledgement information is fed back or a base station that receives the resource information, or may be used by the UE to determine a base station responsible for retransmission. For example, in this embodiment, it is assumed that the base station 1 receives the acknowledgement information (an ACK or a NACK) fed back by the UE, and the base station 1 is responsible for data retransmission. The main control base station, that is, the base station 0, also notifies the base station 1 that the base station 1 is responsible for receiving the acknowledgement information and is responsible for retransmission. Specifically, the base station 0 may also send the configuration information of the physical uplink control channel to the base station 1 in advance, so that the base station 1 learns that retransmission is to be completed by the base station 1.

For example, the configuration information of the physical uplink control channel may include resource configuration information of a PUSCH that carries UCI or a PUCCH. A base station that receives the acknowledgement information and is responsible for retransmission is the base station 1. The base station 0 may also notify the base station 1 of the resource configuration information of the PUSCH that carries the UCI or the PUCCH, so that the base station 1 receives the acknowledgement information according to the resource configuration information. For another example, the transmit power configuration information of the physical uplink control channel may include power configuration information of the PUSCH that carries the UCI or the PUCCH, so that the UE sends the acknowledgement information according to the transmit power configuration information.

For example, if an initially transmitted data packet is correctly received, acknowledgement information fed back by the UE is an ACK, or if an initially transmitted data packet is not correctly received, acknowledgement information fed back by the UE is a NACK.

607. The base station 1 sends retransmission data to the UE.

Before retransmitting the data, the base station 1 has notified, in advance, the UE of CRS information of a base station responsible for retransmission. For a notification manner of the CRS information of the base station 1 that retransmits the data, reference may be made to the foregoing embodiments, and details are not described again.

Specifically, that the base station 1 sends retransmission data to the UE includes: if the base station 1 receives the NACK sent by the UE, sending, by the base station 1 to the user equipment, at least one of the physical downlink control channel that is for retransmission and in the second resource set group, where the at least one of the physical downlink control channel for retransmission carries second control information, and the second control information includes scheduling information of downlink data corresponding to the at least one of the physical downlink control channel for retransmission; and sending the retransmission data to the UE according to the scheduling information.

608. The UE receives the retransmitted data.

In this embodiment of the present invention, a first network device separately configures, for user equipment, a first resource set group that is of a physical downlink control channel set and used for initial transmission and a second resource set group used for retransmission, so that the UE can detect, in the preconfigured first resource set group and second resource set group, a physical downlink control channel used for initial transmission and a physical downlink control channel used for retransmission. In this way, in an HARQ process, the UE can obtain a coordination gain of multiple resources by using multiple preconfigured transmission resources (including resources in the first resource set group and the second resource set group). In addition, the first network device separately preconfigures, for the user equipment, the first resource set group that is of the physical downlink control channel set and used for initial transmission and the second resource set group used for retransmission, which reduces complexity of blind detection, which the UE performs when obtaining a coordination gain, on the physical downlink control channel for retransmission. In addition, in the method in this embodiment, at least two network devices transmit, to the UE, downlink data by using same transmission resource parameter information, to implement joint transmission, which helps enhance signal receiving performance and reliability of the UE.

Embodiment 6

Figure 7:
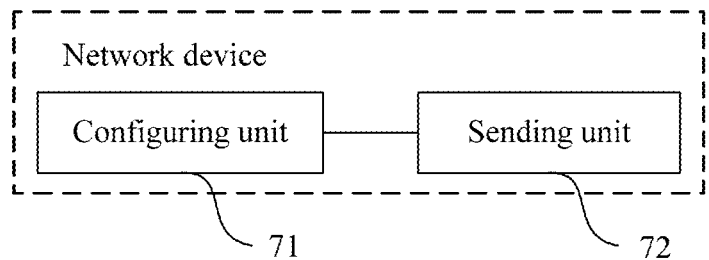
FIG. 7 is a schematic structural diagram of an embodiment of a network device according to the present invention.

FIG. 7 is a schematic structural diagram of an embodiment of a network device according to the present invention. The device in this embodiment may execute the information configuration method in any embodiment of the present invention. As shown in FIG. 7, the device may include a configuring unit 71 and a sending unit 72; where the configuring unit 71 is configured to: configure a first resource set group of a physical downlink control channel set for user equipment, and configure, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set; and the sending unit 72 is configured to send, to the user equipment, information about the first resource set group and information about the second resource set group that are configured by the configuring unit 71.

Further, the sending unit 72 is further configured to: after sending the information about the second resource set group to the user equipment, send at least one physical downlink control channel of the physical downlink control channel in the at least one subset to the user equipment, where the at least one physical downlink control channel carries first control information, and the first control information includes scheduling information of the downlink data.

The information about the second resource set group sent by the sending unit 72 to the user equipment includes a correspondence, and the correspondence is a correspondence between the physical downlink control channel in the at least one subset and the second resource set group or a correspondence between the at least one subset and the second resource set group. Alternatively, the physical downlink control channel that is in the at least one subset and sent by the sending unit 72 to the user equipment further indicates the second resource set group.

Further, the sending unit 72 is further configured to: for the physical downlink control channel in the at least one subset, notify the user equipment of configuration information of a physical uplink control channel and/or transmit power configuration information of the physical uplink control channel, where the physical uplink control channel is used to carry acknowledgement information of the downlink data indicated by the physical downlink control channel.

Figure 8:
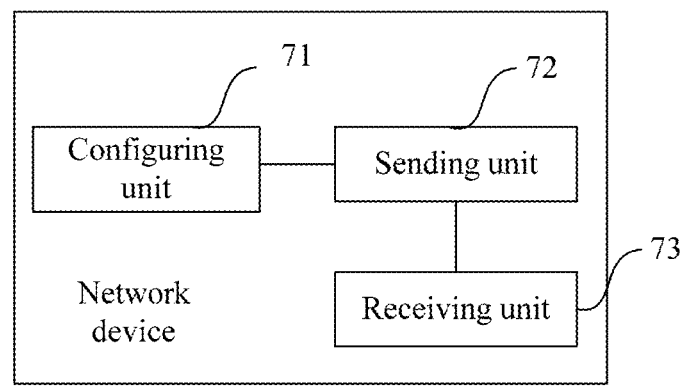
FIG. 8 is a schematic structural diagram of another embodiment of a network device according to the present invention.

FIG. 8 is a schematic structural diagram of another embodiment of a network device according to the present invention. The network device is a first network device. As shown in FIG. 8, based on the structure shown in FIG. 7, further, the network device in this embodiment may further include a receiving unit 73. The receiving unit 73 is configured to receive negative acknowledgement information sent by the user equipment. The sending unit 72 is further configured to: after the receiving unit 73 receives the negative acknowledgement information, send, to the user equipment, at least one of the physical downlink control channel that is for retransmission and in the second resource set group, where the at least one of the physical downlink control channel for retransmission carries second control information, the second control information includes scheduling information of downlink data corresponding to the at least one of the physical downlink control channel for retransmission, the downlink data corresponding to the at least one of the physical downlink control channel for retransmission is sent by a second network device to the user equipment, and the second network device is controlled by the first network device.

Further, the sending unit 72 is further configured to: for the physical downlink control channel in the at least one subset, notify the user equipment of one group of common reference signal CRS rate matching information, where at least one piece of CRS rate matching information in the group of CRS rate matching information includes at least two pieces of CRS pattern information, and the at least one piece of CRS rate matching information in the group of CRS rate matching information is used for rate matching for the downlink data indicated by the physical downlink control channel in the at least one subset.

Further, the information about the first resource set group sent by the sending unit 72 includes time-frequency resource configuration information of the physical downlink control channel set, and/or the information about the second resource set group sent by the sending unit 72 includes time-frequency resource configuration information of the physical downlink control channel for retransmission.

The device in this embodiment may execute the information configuration method in any embodiment of the present invention; therefore, for a corresponding effect that can be obtained by the device, reference may be made to descriptions in the foregoing embodiments, and details are not described herein again.

Embodiment 7

Figure 9:
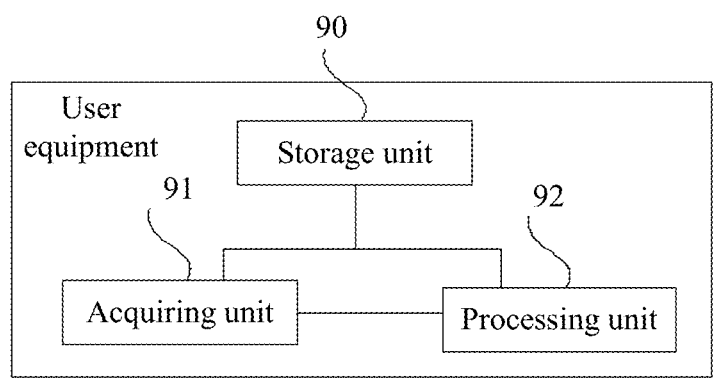
FIG. 9 is a schematic structural diagram of an embodiment of user equipment according to the present invention.

FIG. 9 is a schematic structural diagram of an embodiment of user equipment according to the present invention. The device in this embodiment may execute the data receiving method in any embodiment of the present invention. As shown in FIG. 9, the device may include a storage unit 90, an acquiring unit 91, and a processing unit 92; where the storage unit 90 is configured to: store information that is about a first resource set group of a physical downlink control channel set and sent by a first network device to the user equipment in advance, and store information that is about a second resource set group of a physical downlink control channel for retransmission and sent by the first network device to the user equipment in advance;

the acquiring unit 91 is configured to: receive at least one physical downlink control channel according to the information that is about the first resource set group and stored by the storage unit 90, acquire first control information carried on the at least one physical downlink control channel, and receive downlink data according to scheduling information that is of the downlink data and included in the first control information, where the at least one physical downlink control channel is a physical downlink control channel in at least one subset of the physical downlink control channel set; and the processing unit 92 is configured to detect, in the second resource set group corresponding to the information that is about the second resource set group and stored by the storage unit 90, the physical downlink control channel for retransmission corresponding to the downlink data.

Further, the information that is about the second resource set group and stored by the storage unit 90 includes a correspondence, and the correspondence is a correspondence between the physical downlink control channel in the at least one subset and the second resource set group, or the correspondence is a correspondence between the subset of the physical downlink control channel set and the second resource set group.

The processing unit 92 is further configured to: before detecting, in the second resource set group, the physical downlink control channel for retransmission corresponding to the downlink data, determine, according to the correspondence stored by the storage unit and the at least one physical downlink control channel received by the acquiring unit, the second resource set group corresponding to retransmission of the downlink data.

Further, the processing unit 92 is further configured to determine, according to an indication in the at least one physical downlink control channel received by the acquiring unit 91, the second resource set group corresponding to retransmission of the downlink data.

Figure 10:
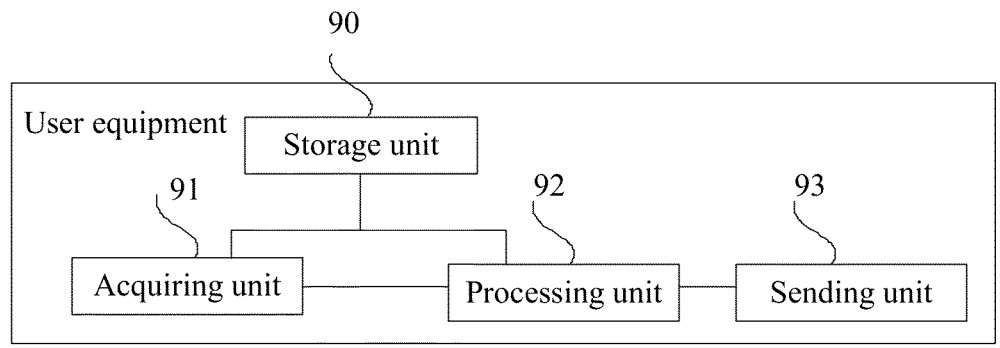
FIG. 10 is a schematic structural diagram of another embodiment of user equipment according to the present invention.

FIG. 10 is a schematic structural diagram of another embodiment of user equipment according to the present invention. As shown in FIG. 10, based on the structure shown in FIG. 9, the acquiring unit 91 is further configured to: for the physical downlink control channel in the at least one subset, receive configuration information that is of a physical uplink control channel and notified by the first network device. The processing unit 92 is further configured to: after the acquiring unit 91 receives the downlink data according to the scheduling information that is of the downlink data and included in the first control information, determine, according to the configuration information that is of the physical uplink control channel and acquired by the acquiring unit 91, resource information of the physical uplink control channel corresponding to the downlink data. The user equipment further includes a sending unit 93, configured to send acknowledgement information of the downlink data according to the resource information that is of the physical uplink control channel and determined by the processing unit 92.

Further, the acquiring unit 91 is further configured to: if the acknowledgement information sent by the sending unit 93 is negative acknowledgement information, receive, according to the information about the second resource set group, at least one of the physical downlink control channel that is for retransmission and in the second resource set group, where the physical downlink control channel for retransmission carries second control information; and receive retransmitted downlink data according to scheduling information included in the second control information, where the scheduling information is scheduling information of the downlink data corresponding to the physical downlink control channel for retransmission.

Further, the acquiring unit 91 is further configured to: for the physical downlink control channel in the at least one subset, receive transmit power configuration information that is of the physical uplink control channel and notified by the first network device. The sending unit 93 is specifically configured to send, in the following manner, the acknowledgement information of the downlink data according to the resource information that is of the physical uplink control channel and determined by the processing unit: determining transmit power information of the physical uplink control channel according to the transmit power configuration information acquired by the acquiring unit 91, and sending the acknowledgement information of the downlink data according to the resource information and the transmit power information of the physical uplink control channel.

Further, the acquiring unit 91 is further configured to: for the physical downlink control channel in the at least one subset, receive one group of common reference signal CRS rate matching information notified by the first network device, where at least one piece of CRS rate matching information in the group of CRS rate matching information includes at least two pieces of CRS pattern information.

The acquiring unit 91 is further configured to: before receiving the downlink data, perform, by using the at least one piece of CRS rate matching information in the group of CRS rate matching information, rate matching on the downlink data indicated by the physical downlink control channel in the at least one subset.

Further, the transmit power configuration information received by the acquiring unit 91 includes reference signal power. The sending unit 93 is specifically configured to: in the following manner, determine the transmit power information of the physical uplink control channel according to the transmit power configuration information acquired by the acquiring unit 91, and send the acknowledgement information of the downlink data according to the resource information and the transmit power information of the physical uplink control channel: determining a downlink path loss estimate according to the reference signal power, determining transmit power of the physical uplink control channel according to the downlink path loss estimate, and sending the acknowledgement information of the downlink data according to the resource information and the transmit power of the physical uplink control channel.

The device in this embodiment may execute the data receiving method in any embodiment of the present invention; therefore, for a corresponding effect that can be obtained by the device, reference may be made to descriptions in the foregoing embodiments, and details are not described herein again.

Embodiment 8

Figure 11:
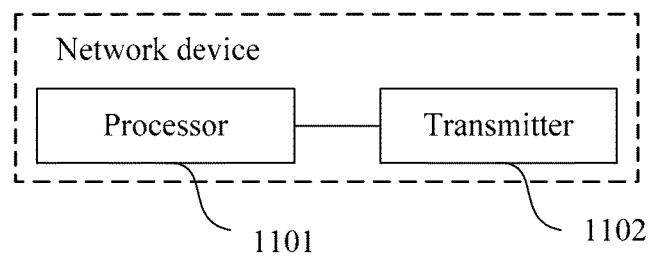
FIG. 11 is a schematic diagram of a physical structure of an embodiment of a network device according to the present invention.

FIG. 11 is a schematic diagram of a physical structure of an embodiment of a network device according to the present invention. The network device is used to implement the information configuration method in embodiments of the present invention, and for an operating principle of the network device, reference may be made to the foregoing method embodiment. As shown in FIG. 11, the network device may include a processor 1101 and a transmitter 1102; where the processor 1101 is configured to: configure a first resource set group of a physical downlink control channel set for user equipment, and configure, for the user equipment, a second resource set group of a physical downlink control channel for retransmission, where the physical downlink control channel for retransmission is a physical downlink control channel for retransmission corresponding to downlink data indicated by a physical downlink control channel in at least one subset of the physical downlink control channel set; and the transmitter 1102 is configured to send, to the user equipment, information about the first resource set group and information about the second resource set group that are configured by the processor 1101.

Further, the transmitter 1102 is further configured to: after sending the information about the second resource set group to the user equipment, send at least one physical downlink control channel of the physical downlink control channel in the at least one subset to the user equipment, where the at least one physical downlink control channel carries first control information, and the first control information includes scheduling information of the downlink data.

Further, the information about the second resource set group sent by the transmitter includes a correspondence, and the correspondence is a correspondence between the physical downlink control channel in the at least one subset and the second resource set group or a correspondence between the at least one subset and the second resource set group. Alternatively, the physical downlink control channel that is in the at least one subset and sent by the transmitter to the user equipment further indicates the second resource set group.

Further, the transmitter 1102 is further configured to: for the physical downlink control channel in the at least one subset, notify the user equipment of configuration information of a physical uplink control channel and/or transmit power configuration information of the physical uplink control channel, where the physical uplink control channel is used to carry acknowledgement information.

The device in this embodiment may execute the information configuration method in any embodiment of the present invention; therefore, for a corresponding effect that can be obtained by the device, reference may be made to descriptions in the foregoing embodiments, and details are not described herein again.

Figure 12:
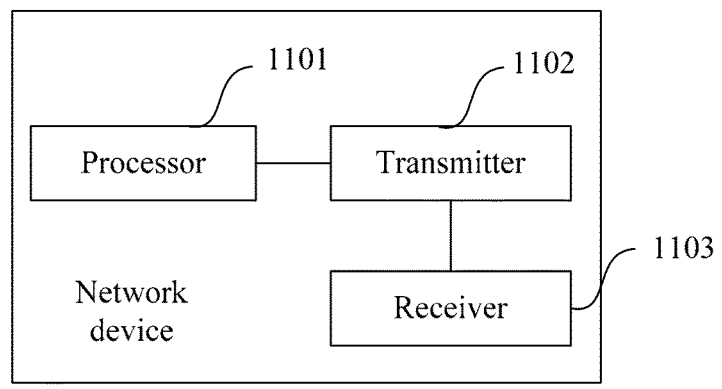
FIG. 12 is a schematic diagram of a physical structure of another embodiment of a network device according to the present invention.

FIG. 12 is a schematic diagram of a physical structure of another embodiment of a network device according to the present invention. As shown in FIG. 12, the network device may further include a receiver 1103, configured to receive negative acknowledgement information sent by the user equipment. The transmitter is further configured to: after the receiver 1103 receives the negative acknowledgement information, send, to the user equipment, at least one of the physical downlink control channel that is for retransmission and in the second resource set group, where the at least one of the physical downlink control channel for retransmission carries second control information, the second control information includes scheduling information of downlink data corresponding to the at least one of the physical downlink control channel for retransmission, the downlink data corresponding to the at least one of the physical downlink control channel for retransmission is sent by a second network device to the user equipment, and the second network device is controlled by the first network device.

Further, the transmitter 1102 is further configured to: for the physical downlink control channel in the at least one subset, notify the user equipment of one group of common reference signal CRS rate matching information, where at least one piece of CRS rate matching information in the group of CRS rate matching information includes at least two pieces of CRS pattern information, and the at least one piece of CRS rate matching information in the group of CRS rate matching information is used for rate matching for the downlink data indicated by the physical downlink control channel in the at least one subset.

Optionally, the information about the first resource set group sent by the transmitter 1102 includes time-frequency resource configuration information of the physical downlink control channel set, and/or the information about the second resource set group sent by the transmitter 1102 includes time-frequency resource configuration information of the physical downlink control channel for retransmission.

The device in this embodiment may execute the information configuration method in any embodiment of the present invention; therefore, for a corresponding effect that can be obtained by the device, reference may be made to descriptions in the foregoing embodiments, and details are not described herein again.

Embodiment 9

Figure 13:
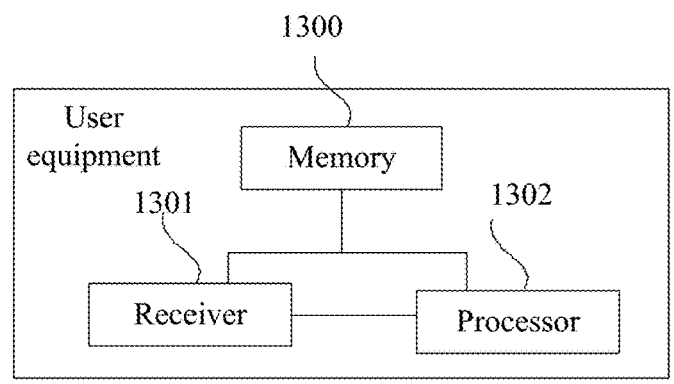
FIG. 13 is a schematic diagram of a physical structure of an embodiment of user equipment according to the present invention.

FIG. 13 is a schematic diagram of a physical structure of an embodiment of user equipment according to the present invention. The user equipment is used to implement the data receiving method in embodiments of the present invention, and for an operating principle of the user equipment, reference may be made to the foregoing method embodiment. As shown in FIG. 13, the user equipment may include a memory 1300, a receiver 1301, and a processor 1302.

The memory 1300 is configured to: store information that is about a first resource set group of a physical downlink control channel set and sent by a first network device to the user equipment in advance, and store information that is about a second resource set group of a physical downlink control channel for retransmission and sent by the first network device to the user equipment in advance;

the receiver 1301 is configured to: receive at least one physical downlink control channel according to the information that is about the first resource set group and stored by the memory 1300, acquire first control information carried on the at least one physical downlink control channel, and receive downlink data according to scheduling information that is of the downlink data and included in the first control information, where the at least one physical downlink control channel is a physical downlink control channel in at least one subset of the physical downlink control channel set; and the processor 1302 is configured to detect, in the second resource set group corresponding to the information that is about the second resource set group and stored by the memory 1300, the physical downlink control channel for retransmission corresponding to the downlink data.

Further, the processor 1302 is further configured to: before detecting, in the second resource set group, the physical downlink control channel for retransmission corresponding to the downlink data, determine, according to the correspondence stored by the memory 1300 and the at least one physical downlink control channel received by the receiver 1301, the second resource set group corresponding to retransmission of the downlink data.

Further, the processor 1302 is further configured to determine, according to an indication in the at least one physical downlink control channel received by the receiver 1301, the second resource set group corresponding to retransmission of the downlink data.

Figure 14:
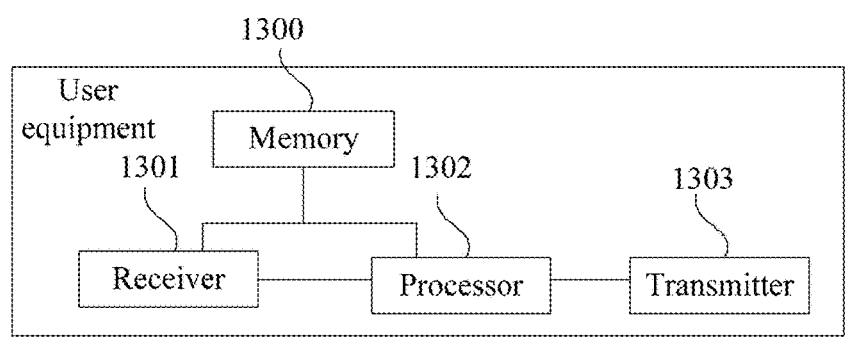
FIG. 14 is a schematic diagram of a physical structure of another embodiment of user equipment according to the present invention.

FIG. 14 is a schematic diagram of a physical structure of another embodiment of user equipment according to the present invention. As shown in FIG. 14, the receiver 1301 is further configured to: for the physical downlink control channel in the at least one subset, receive configuration information that is of a physical uplink control channel and notified by the first network device. The processor 1302 is further configured to: after the receiver 1301 receives the downlink data according to the scheduling information that is of the downlink data and included in the first control information, determine, according to the configuration information that is of the physical uplink control channel and acquired by the receiver 1301, resource information of the physical uplink control channel corresponding to the downlink data. The user equipment further includes a transmitter 1303, configured to send acknowledgement information of the downlink data according to the resource information that is of the physical uplink control channel and determined by the processor 1302.

Further, the receiver 1301 is further configured to: if the acknowledgement information sent by the transmitter 1303 is negative acknowledgement information, receive, according to the information about the second resource set group, at least one of the physical downlink control channel that is for retransmission and in the second resource set group, where the physical downlink control channel for retransmission carries second control information; and receive retransmitted downlink data according to scheduling information included in the second control information, where the scheduling information is scheduling information of the downlink data corresponding to the physical downlink control channel for retransmission.

Further, the receiver 1301 is further configured to: for the physical downlink control channel in the at least one subset, receive transmit power configuration information that is of the physical uplink control channel and notified by the first network device. The transmitter 1303 is specifically configured to send, in the following manner, the acknowledgement information of the downlink data according to the resource information that is of the physical uplink control channel and determined by the processor 1302: determining transmit power information of the physical uplink control channel according to the transmit power configuration information received by the receiver 1301, and sending the acknowledgement information of the downlink data according to the resource information and the transmit power information of the physical uplink control channel.

Further, the receiver 1301 is further configured to: for the physical downlink control channel in the at least one subset, receive one group of common reference signal CRS rate matching information notified by the first network device, where at least one piece of CRS rate matching information in the group of CRS rate matching information includes at least two pieces of CRS pattern information. The receiver is further configured to: before receiving the downlink data, perform, by using the at least one piece of CRS rate matching information in the group of CRS rate matching information, rate matching on the downlink data indicated by the physical downlink control channel in the at least one subset.

Further, the transmit power configuration information received by the receiver 1301 includes reference signal power. The transmitter 1303 is specifically configured to: in the following manner, determine the transmit power information of the physical uplink control channel according to the transmit power configuration information acquired by the receiver 1301, and send the acknowledgement information of the downlink data according to the resource information and the transmit power information of the physical uplink control channel: determining a downlink path loss estimate according to the reference signal power, determining transmit power of the physical uplink control channel according to the downlink path loss estimate, and sending the acknowledgement information of the downlink data according to the resource information and the transmit power of the physical uplink control channel.

The device in this embodiment may execute the data receiving method in any embodiment of the present invention; therefore, for a corresponding effect that can be obtained by the device, reference may be made to descriptions in the foregoing embodiments, and details are not described herein again.

Embodiment 10

Figure 15:
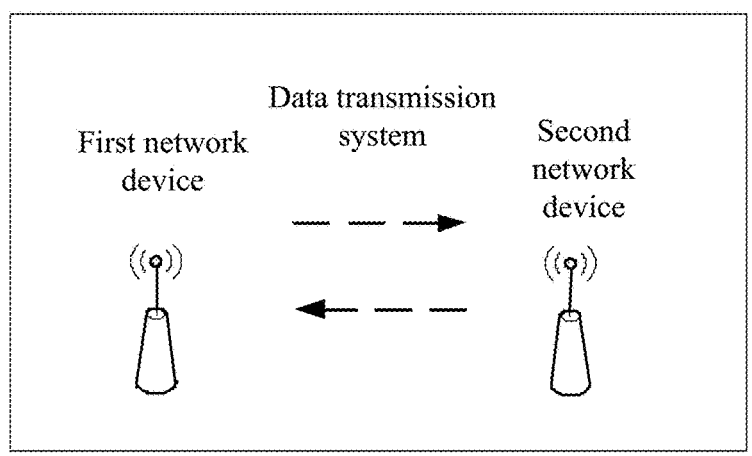
FIG. 15 is a schematic structural diagram of an embodiment of a data transmission system according to the present invention.

An embodiment provides a data transmission system. As shown in FIG. 15, the system includes a first network device and a second network device.

The first network device is configured to: send a transmission resource parameter to the second network device, and transmit downlink data to user equipment by using the transmission resource parameter;

the second network device is configured to transmit the downlink data to the user equipment by using the transmission resource parameter sent by the first network device; and the first network device is further configured to:

notify the user equipment of configuration information of an uplink control channel resource, where the configuration information of the uplink control channel resource is used to indicate, for the user equipment, resource configuration information for sending acknowledgement information corresponding to the downlink data; and receive the acknowledgement information, or instruct the second network device to receive the acknowledgement information.

The transmission resource parameter in this embodiment may include at least one of a physical resource used for transmitting the downlink data, a modulation and coding manner, a data block size, a time at which a data block is sent, and an HARQ process number each time a data block is sent. The first network device and the second network device may send the downlink data to the user equipment according to information included in the transmission resource parameter.

When the second network device and the first network device jointly transmit the data to the UE, the second network device and the first network device transmit, at at least one subframe, the same downlink data to the UE by using the same transmission resource parameter, so that the downlink data is jointly transmitted to the UE.

If the first network device is further configured to receive the acknowledgement information, and when the acknowledgement information is a negative acknowledgement, the first network device is further configured to retransmit the downlink data to the user equipment;

or, if the first network device is further configured to instruct the second network device to receive the acknowledgement information, and when the acknowledgement information is a negative acknowledgement, the second network device is further configured to retransmit the downlink data to the user equipment.

Further, the first network device may be specifically configured to instruct, in the following manner, the second network device to receive the acknowledgement information:

notifying, by the first network device, the second network device of the configuration information of the uplink control channel resource that carries the acknowledgement information.

Optionally, the second network device is further configured to receive one group of common reference signal CRS rate matching information sent by the first network device; and the first network device is further configured to: before transmitting the downlink data to the user equipment by using the transmission resource parameter, determine, from the group of CRS rate matching information, CRS information corresponding to transmission of the downlink data, and perform rate matching by using the determined CRS information; or the second network device is further configured to: before transmitting the downlink data to the user equipment by using the transmission resource parameter, determine, from the group of CRS rate matching information, CRS information corresponding to transmission of the downlink data, and perform rate matching by using the determined CRS information.

In the solution in this embodiment, a transmission point used for initial transmission may be different from a transmission point used for retransmission; therefore, in a non-ideal backhaul case, for initial transmission, data may be sent to the UE in a coordinated manner, so that reliability of data sending is higher.

Further, the first network device may also notify the second network device of the configuration information of the uplink control channel resource that carries the acknowledgement information. For example, a main control base station such as a base station 0 may also separately notify the UE and a base station that is responsible for retransmission, such as a base station 1, of the configuration information of the uplink control channel resource that carries the acknowledgement information. In this case, the UE may send, according to the configuration information, the acknowledgement information corresponding to the downlink data, and the base station 1 also knows that resource information of the acknowledgement information corresponding to the downlink data is to be received by the base station 1. If the acknowledgement information fed back by the UE is a NACK, the base station 1 retransmits the downlink data to the UE.

Embodiment 11

Figure 16:
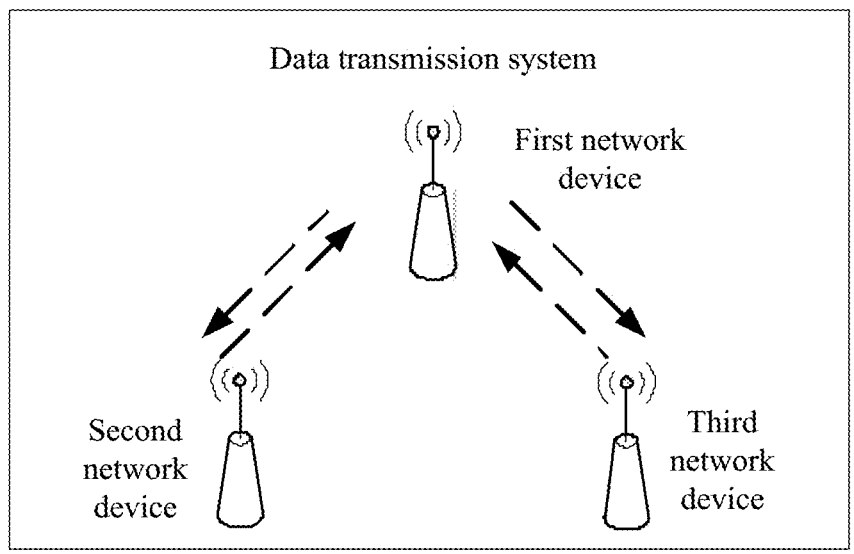
FIG. 16 is a schematic structural diagram of another embodiment of a data transmission system according to the present invention.

An embodiment provides a system for implementing data transmission. As shown in FIG. 16, the system includes a first network device, a second network device, and a third network device; where the first network device is configured to send a transmission resource parameter to the second network device and/or the third network device;

the second network device is configured to transmit downlink data to user equipment by using the transmission resource parameter sent by the first network device; and/or the third network device is configured to transmit the downlink data to the user equipment by using the transmission resource parameter sent by the first network device; and the first network device is further configured to:

notify the user equipment of configuration information of an uplink control channel resource, where the configuration information of the uplink control channel resource is used to indicate, for the user equipment, resource configuration information for sending acknowledgement information corresponding to the downlink data; and receive the acknowledgement information, or instruct the second network device or the third network device to receive the acknowledgement information.

If the first network device is further configured to receive the acknowledgement information, and when the acknowledgement information is a negative acknowledgement, the first network device is further configured to retransmit the downlink data to the user equipment;

or, if the first network device is further configured to instruct the second network device to receive the acknowledgement information, and when the acknowledgement information is a negative acknowledgement, the second network device is further configured to retransmit the downlink data to the user equipment;

or, if the first network device is further configured to instruct the third network device to receive the acknowledgement information, and when the acknowledgement information is a negative acknowledgement, the third network device is further configured to retransmit the downlink data to the user equipment.

When the second network device and the third network device jointly transmit the data to the UE, the second network device and the third network device transmit, at at least one subframe, the same downlink data to the UE by using the same transmission resource parameter, so that the downlink data is jointly transmitted to the UE. Further, before the second network device and the third network device transmit, at the at least one subframe, the same downlink data to the user equipment by using the same transmission resource parameter, the following is further included: receiving, by the second network device and the third network device, the transmission resource parameter information notified by the first network device. For example, a base station 1 and a base station 2 are notified of the transmission resource parameter information by a base station 0 in advance.

Further, that the first network device instructs the second network device or the third network device to receive the acknowledgement information may include: notifying, by the first network device, the second network device or the third network device of the configuration information of the uplink control channel resource that carries the acknowledgement information.

Optionally, the first network device is further configured to notify the second network device and/or the third network device of one group of CRS rate matching information; and the second network device is further configured to: before transmitting the downlink data to the user equipment by using the transmission resource parameter sent by the first network device, determine, by using the group of CRS rate matching information, CRS information corresponding to transmission of the downlink data, and perform rate matching by using the determined CRS information; or the third network device is further configured to: before transmitting the downlink data to the user equipment by using the transmission resource parameter sent by the first network device, determine, by using the group of CRS rate matching information, CRS information corresponding to transmission of the downlink data, and perform rate matching by using the determined CRS information.

In the system in this embodiment, in a non-ideal backhaul scenario, at least two network devices can send data to the user equipment in a coordinated manner to obtain a coordination gain.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An information configuration method, comprising:
   configuring, by a first network device, a first resource set group of a physical downlink control channel set for a terminal device, and configuring, for the terminal device, a second resource set group of a physical downlink control channel for retransmission, wherein the physical downlink control channel for retransmission is a physical downlink control channel used for retransmission of downlink data which is indicated by a physical downlink control channel in at least one subset of the physical downlink control channel set; and
   sending, by the first network device, information about the first resource set group and information about the second resource set group to the terminal device,
   wherein the information about the second resource set group comprises a correspondence, and the correspondence is a correspondence between the physical downlink control channel in the at least one subset and the second resource set group or a correspondence between the at least one subset and the second resource set group.

2. The method according to claim 1, after the sending information about the second resource set group to the terminal device, further comprising:
   sending, by the first network device, at least one physical downlink control channel of the physical downlink control channel in the at least one subset to the terminal device, wherein the at least one physical downlink control channel carries first control information, and the first control information comprises scheduling information of the downlink data; and/or
   sending, by a second network device, at least one physical downlink control channel of the physical downlink control channel in the at least one subset to the terminal device, wherein the at least one physical downlink control channel carries first control information, the first control information comprises scheduling information of the downlink data, and the second network device is controlled by the first network device.

3. The method according to claim 1, further comprising:
for the physical downlink control channel in the at least one subset, notifying, by the first network device, the terminal device of configuration information of a physical uplink control channel and/or transmit power configuration information of the physical uplink control channel, wherein the physical uplink control channel is used to carry acknowledgement information of the downlink data indicated by the physical downlink control channel.

4. The method according to claim 2,
after the sending, by the first network device, at least one physical downlink control channel of the physical downlink control channel in the at least one subset to the terminal device, further comprising: if the second network device receives negative acknowledgement information sent by the terminal device, sending, by the second network device to the terminal device, at least one of the physical downlink control channel that is for retransmission and in the second resource set group, wherein the at least one of the physical downlink control channel for retransmission carries second control information, and the second control information comprises scheduling information of downlink data corresponding to the at least one of the physical downlink control channel for retransmission; or
after the sending, by a second network device, at least one physical downlink control channel of the physical downlink control channel in the at least one subset to the terminal device, further comprising: if the first network device receives negative acknowledgement information sent by the terminal device, sending, by the first network device to the terminal device, the at least one of the physical downlink control channel that is for retransmission and in the second resource set group, wherein the at least one of the physical downlink control channel for retransmission carries second control information, and the second control information comprises scheduling information of downlink data corresponding to the at least one of the physical downlink control channel for retransmission.

5. A data receiving method, comprising:
receiving, by a terminal device, at least one physical downlink control channel according to information about a first resource set group sent by a first network device, acquiring first control information carried on the at least one physical downlink control channel, and receiving downlink data according to scheduling information that is of the downlink data and comprised in the first control information, wherein the first resource set group is a resource set that is of a physical downlink control channel set and preconfigured by the first network device for the terminal device, and the at least one physical downlink control channel is a physical downlink control channel in at least one subset of the physical downlink control channel set; and
detecting, by the terminal device in a second resource set group corresponding to information about the second resource set group sent by the first network device, a physical downlink control channel used for retransmission of the downlink data, wherein the second resource set group is a resource set that is of a physical downlink control channel for retransmission and preconfigured by the first network device for the terminal device,
wherein the information about the second resource set group comprises a correspondence, and the correspondence is a correspondence between the physical downlink control channel in the at least one subset and the second resource set group, or the correspondence is a correspondence between the at least one subset and the second resource set group.

6. The method according to claim 5, before the detecting, by the terminal device in a second resource set group, a physical downlink control channel for retransmission corresponding to the downlink data, further comprising:
determining, by the terminal device according to the at least one received physical downlink control channel and the correspondence comprised in the information about the second resource set group, the second resource set group corresponding to retransmission of the downlink data.

7. The method according to claim 5, before the detecting, by the terminal device in a second resource set group corresponding to information about the second resource set group sent by the first network device, a physical downlink control channel for retransmission corresponding to the downlink data, further comprising:
determining, by the terminal device according to an indication in the at least one received physical downlink control channel, the second resource set group corresponding to retransmission of the downlink data.

8. The method according to claim 5, wherein:
the method further comprises: for the physical downlink control channel in the at least one subset, receiving, by the terminal device, configuration information that is of a physical uplink control channel and notified by the first network device; and
after the receiving downlink data according to scheduling information that is of the downlink data and comprised in the first control information, the method further comprises: determining, by the terminal device according to the configuration information of the physical uplink control channel, resource information of the physical uplink control channel corresponding to the downlink data, and sending acknowledgement information of the downlink data according to the resource information of the physical uplink control channel.

9. The method according to claim 8, after the receiving downlink data according to scheduling information that is of the downlink data and comprised in the first control information, further comprising:
if the acknowledgement information is negative acknowledgement information, receiving, by the terminal device according to the information about the second resource set group, at least one of the physical downlink control channel that is for retransmission and in the second resource set group, wherein the physical downlink control channel for retransmission carries second control information; and
receiving, by the terminal device, retransmitted downlink data according to scheduling information comprised in the second control information, wherein the scheduling information is scheduling information of the downlink data corresponding to the physical downlink control channel for retransmission.

10. A network device, comprising:
a transceiver, and
a processor communicatively connected with the transceiver, wherein
the processor is configured to: configure a first resource set group of a physical downlink control channel set for a terminal device, and configure, for the terminal device, a second resource set group of a physical downlink control channel for retransmission, wherein the physical downlink control channel for retransmission is a physical downlink control channel used for retransmission of downlink data which is indicated by a physical downlink control channel in at least one subset of the physical downlink control channel set; and a transceiver is configured to send, to the terminal device, information about the first resource set group and information about the second resource set group, wherein the information about the second resource set group comprises a correspondence, and the correspondence is a correspondence between the physical downlink control channel in the at least one subset and the second resource set group or a correspondence between the at least one subset and the second resource set group.

11. The network device according to claim 10, wherein:
the transceiver is further configured to: after sending the information about the second resource set group to the terminal device, send at least one physical downlink control channel of the physical downlink control channel in the at least one subset to the terminal device, wherein the at least one physical downlink control channel carries first control information, and the first control information comprises scheduling information of the downlink data.

12. The network device according to claim 10, wherein:
the transceiver is further configured to: for the physical downlink control channel in the at least one subset, notify the terminal device of configuration information of a physical uplink control channel and/or transmit power configuration information of the physical uplink control channel, wherein the physical uplink control channel is used to carry acknowledgement information of the downlink data indicated by the physical downlink control channel.

13. The network device according to claim 10, wherein the network device is a first network device;
the transceiver is further configured to
receive negative acknowledgement information from the terminal device; and
send, to the terminal device, at least one of the physical downlink control channel that is for retransmission and in the second resource set group, wherein the at least one of the physical downlink control channel for retransmission carries second control information, the second control information comprises scheduling information of downlink data corresponding to the at least one of the physical downlink control channel for retransmission, the downlink data corresponding to the at least one of the physical downlink control channel for retransmission is sent by a second network device to the terminal device, and the second network device is controlled by the first network device.

14. A terminal device, comprising: a memory, a processor, and a transceiver;
the memory is configured to: store information that is about a first resource set group of a physical downlink control channel set and sent by a first network device to the terminal device, and store information that is about a second resource set group of a physical downlink control channel for retransmission and sent by the first network device to the terminal device;
the transceiver is configured to: receive at least one physical downlink control channel according to the information that is about the first resource set group;

the processor is configured to: acquire first control information carried on the at least one physical downlink control channel;
the transceiver is further configured to: receive downlink data according to scheduling information that is of the downlink data and comprised in the first control information, wherein the at least one physical downlink control channel is a physical downlink control channel in at least one subset of the physical downlink control channel set; and
the processor is further configured to: detect, in the second resource set group corresponding to the information that is about the second resource set group, a physical downlink control channel used for retransmission of the downlink data,
wherein the information about the second resource set group comprises a correspondence, and the correspondence is a correspondence between the physical downlink control channel in the at least one subset and the second resource set group, or the correspondence is a correspondence between the at least one subset and the second resource set group.

15. The terminal device according to claim 14, wherein:
the processor is further configured to: before detecting, in the second resource set group, the physical downlink control channel used for retransmission of the downlink data, determine, according to the correspondence and the at least one physical downlink control channel, the second resource set group corresponding to retransmission of the downlink data.

16. The terminal device according to claim 14, wherein:
the processor is further configured to determine, according to an indication in the at least one physical downlink control channel, the second resource set group corresponding to retransmission of the downlink data.

17. The terminal device according to claim 14, wherein:
the processor is further configured to: for the physical downlink control channel in the at least one subset, receive configuration information that is of a physical uplink control channel and notified by the first network device;
the processor is further configured to: after receiving the downlink data according to the scheduling information that is of the downlink data and comprised in the first control information, determine, according to the configuration information that is of the physical uplink control channel, resource information of the physical uplink control channel corresponding to the downlink data; and
the transceiver is further configured to send acknowledgement information of the downlink data according to the resource information that is of the physical uplink control channel.

18. The terminal device according to claim 17, wherein:
the processor is further configured to: if the acknowledgement information is negative acknowledgement information, receive, according to the information about the second resource set group, at least one of the physical downlink control channel that is for retransmission and in the second resource set group, wherein the physical downlink control channel for retransmission carries second control information; and receive retransmitted downlink data according to scheduling information comprised in the second control information, wherein the scheduling information is scheduling information of the downlink data corresponding to the physical downlink control channel for retransmission.

\* \* \* \* \*